US012444271B2

(12) United States Patent
Walsh et al.

(10) Patent No.: US 12,444,271 B2
(45) Date of Patent: Oct. 14, 2025

(54) ELECTRONIC GAMING SYSTEMS AND METHODS WITH MIXING AND MATCHING MULTIPLE METAMORPHICS AND BONUS GAME PICK FEATURE ENHANCEMENTS

(71) Applicant: Aristocrat Technologies, Inc., Las Vegas, NV (US)

(72) Inventors: Kevin Walsh, Reno, NV (US); Daniel Marston, Reno, NV (US); Jeffrey Uss, Liberty Hill, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 288 days.

(21) Appl. No.: 18/222,812

(22) Filed: Jul. 17, 2023

(65) Prior Publication Data

US 2024/0087421 A1 Mar. 14, 2024

Related U.S. Application Data

(60) Provisional application No. 63/375,183, filed on Sep. 9, 2022.

(51) Int. Cl.
*G07F 17/32* (2006.01)

(52) U.S. Cl.
CPC ...... *G07F 17/3267* (2013.01); *G07F 17/3213* (2013.01); *G07F 17/3262* (2013.01)

(58) Field of Classification Search
None
See application file for complete search history.

(56) References Cited

U.S. PATENT DOCUMENTS

2007/0021174 A1* 1/2007 Duhamel ............ G07F 17/3239 463/16
2008/0153563 A1 6/2008 Englman
2010/0029381 A1* 2/2010 Vancura .............. G07F 17/3267 463/30
2014/0087855 A1* 3/2014 Caputo ............... G07F 17/3225 463/26
2014/0274300 A1 9/2014 Fujisawa
2019/0362599 A1* 11/2019 Wodarz ............... G07F 17/3244
2020/0380827 A1 12/2020 Sanborn
2021/0065504 A1 3/2021 Delekta
2022/0028218 A1 1/2022 Davis

* cited by examiner

*Primary Examiner* — Jason T Yen
(74) *Attorney, Agent, or Firm* — Armstrong Teasdale LLP

(57) ABSTRACT

An electronic gaming system includes a display device and a game controller in communication with the display device. The game controller includes a processor and a memory storing instructions that, when executed by the processor, cause the game controller to: determine that a bonus game including display of pick icons is triggered based on a game outcome; activate a metamorphic for the bonus game based on the game outcome, the activated metamorphic being associated with a pick feature enhancement for the bonus game; cause display of a visual indication of the activated metamorphic; initiate a play of the bonus game and apply the pick feature enhancement associated with the activated metamorphic thereto; receive a selection of one of the pick icons during the play of the bonus game; and cause display of an award associated with the selected pick icon and determined based on the applied pick feature enhancement.

20 Claims, 10 Drawing Sheets

ELECTRONIC GAMING SYSTEMS AND METHODS WITH MIXING AND MATCHING MULTIPLE METAMORPHICS AND BONUS GAME PICK FEATURE ENHANCEMENTS

CROSS-REFERENCE TO RELATED APPLICATION

This application claims priority to U.S. Provisional Patent Application No. 63/375,183, filed Sep. 9, 2022, the disclosure of which is hereby incorporated by reference herein in its entirety.

TECHNICAL FIELD

The field of disclosure relates generally to electronic gaming, and more specifically, to electronic gaming systems and methods that include presenting multiple metamorphics that award pick feature enhancements by activating the metamorphics individually or in combination.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Notably, some games may include an element of skill on the part of the player and are therefore not entirely random.

BRIEF DESCRIPTION

In one aspect, an electronic gaming system that includes at least one display device, an input device, and a game controller in communication with the at least one display device and the input device is provided. The at least one display device is configured to display an electronic game that includes a base game, a bonus game, and metamorphics associated with pick feature enhancements for the bonus game. The input device is operable to receive a player input. The game controller includes at least one processor and at least one memory, the at least one memory storing instructions that, when executed by the at least one processor, cause the game controller to: determine that the bonus game is triggered based on a game outcome of the base game, the bonus game including display of pick icons; activate at least one of the metamorphics for the bonus game based on the game outcome, the at least one activated metamorphic being associated with at least one of the pick feature enhancements; cause display of a visual indication of the at least one activated metamorphic; initiate a play of the bonus game and apply the at least one pick feature enhancement associated with the at least one activated metamorphic thereto; receive, via the input device, the player input indicative of a selection of at least one of the pick icons during the play of the bonus game; and cause display of an award associated with the at least one selected pick icon, wherein the award is determined based on the at least one pick feature enhancement applied to the play of the bonus game. The instructions may direct additional, less, or alternate functionality, including that discussed elsewhere herein.

In another aspect, a non-transitory computer-readable storage medium with instructions stored thereon is provided. In response to execution by at least one processor, the stored instructions cause the at least one processor to: generate a game outcome of a base game on at least one display device, the base game including display of metamorphics on the at least one display device, the metamorphics being associated with pick feature enhancements for a bonus game; determine that the bonus game is triggered based on the game outcome, the bonus game including display of pick icons on the at least one display device; activate at least one of the metamorphics for the bonus game based on the game outcome, the at least one activated metamorphic being associated with at least one of the pick feature enhancements; cause display of a visual indication of the at least one activated metamorphic; initiate a play of the bonus game and apply the at least one pick feature enhancement associated with the at least one activated metamorphic thereto; receive, via an input device, a player input indicative of a selection of at least one of the pick icons during the play of the bonus game; and cause display of an award associated with the at least one selected pick icon, wherein the award is determined based on the at least one pick feature enhancement applied to the play of the bonus game. The instructions may direct additional, less, or alternate functionality, including that discussed elsewhere herein.

In another aspect, a computer-implemented method of electronic gaming is provided. The method comprises: generating a game outcome of a base game on at least one display device, the base game including display of metamorphics on the at least one display device, the metamorphics being associated with pick feature enhancements for a bonus game; determining that the bonus game is triggered based on the game outcome, the bonus game including display of pick icons on the at least one display device; activating at least one of the metamorphics for the bonus game based on the game outcome, the at least one activated metamorphic being associated with at least one of the pick feature enhancements; controlling the at least one display device to display a visual indication of the at least one activated metamorphic; initiating a play of the bonus game and applying the at least one pick feature enhancement associated with the at least one activated metamorphic thereto; receiving, via an input device, a player input indicative of a selection of at least one of the pick icons during the play of the bonus game; and controlling the at least one display device to display an award associated with the at least one selected pick icon, wherein the award is determined based on the at least one pick feature enhancement applied to the play of the bonus game. The method may include additional, less or alternate actions, including those discussed elsewhere herein.

DETAILED DESCRIPTION

Figure 1:
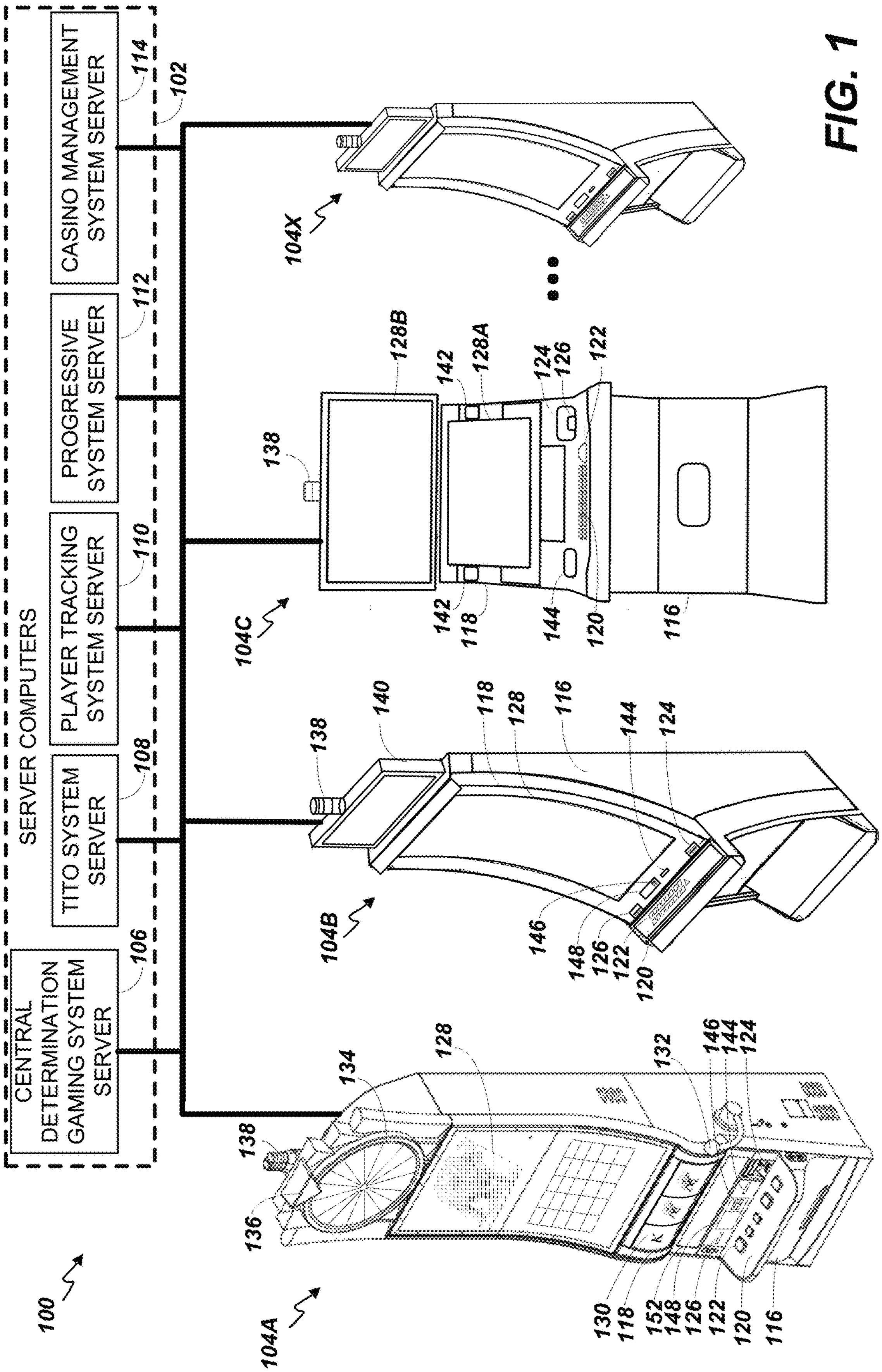
FIG. 1 is an exemplary diagram showing several EGMs networked with various gaming related servers.

In conventional electronic gaming systems and methods, awards and/or outcomes of a primary game may be presented to a player as awards and/or outcomes of a secondary game. For example, an electronic gaming device operating a Class II (e.g., bingo or keno) game may present an outcome of the Class II game as a reel game (e.g., a slot game) simulation. The outcome of the Class II game is determinative of an outcome of the simulated reel game. For example, an award value associated with the Class II game outcome may be presented in the simulated reel game outcome as a symbol combination and/or one or more special symbols that correspond to the same award value. In some known Class II games, the award value of the Class II game outcome may be partitioned or distributed across a base reel game outcome and one or more bonus game outcomes (e.g., outcomes of one or more free reel spins). For example, an award value associated with one or more winning bingo patterns may be presented as being awarded in a base reel game outcome and one or more bonus reel game outcomes. While some variations exist for presenting the Class II game outcome across the base reel game outcome and/or the one or more bonus reel game outcomes exist, the variability and flexibility in presenting these outcomes remain limited. A need exists to address these limitations to facilitate increasing player excitement and engagement.

The present application is directed to electronic gaming, and more particularly, to computer based electronic gaming systems and methods that include providing an electronic game including a bonus pick feature game that may be associated with enhancements linked to multiple metamorphics displayed during a base game. The metamorphics may be selectively activated, individually or in combination, based on a game outcome of the base game. Activation of one or more of the metamorphics is associated with a pick feature enhancement award for the bonus pick feature game. A metamorphic is a symbol or other graphic that is capable of transforming (or "metamorphosing") with an animation during game play (e.g., between a base game and a bonus game). Metamorphics may be associated with and/or trigger enhancements shown during game play that are applied to the bonus game. Transformation or other animation associated with metamorphics may visually indicate that a game feature has been triggered or that the metamorphics are slowly maturing towards a trigger condition for a game feature. A pick feature enhancement is an enhancement of an outcome of a pick bonus game that applies to each pick initiated by a player within the bonus game. The metamorphics correspond to or are associated with the pick feature enhancements of the bonus game, and the pick feature enhancements may be triggered if a corresponding metamorphic trigger symbol appears on the reels of the base game during game play. The bonus game may include a plurality of pick icons and a selected pick icon may reveal an outcome that may be enhanced by a pick feature enhancement applied to the bonus game.

For example, as part of the base game, symbols may be displayed on reels and the symbols may include a coin symbol (e.g., metamorphic trigger symbol). The coin symbol may be red, yellow, or blue, corresponding to a safe symbol (e.g., metamorphic) of the same color displayed above the reels. In some examples, a red coin symbol may be displayed on the reels, activating a bonus game that displays a safe-opening animation (e.g., the metamorphic display change) that transforms the red safe symbol into a red opened safe symbol (e.g., activated metamorphic). The bonus game may display a plurality of mini green safe symbols (e.g., pick icons), each of which are available to be selected (e.g., picked) by a player. When a player selection of a mini green safe symbol is received, a safe-opening animation that transforms the mini green safe symbol into a mini green opened safe symbol may be displayed. The display of the mini green opened safe symbol may be overlaid with the display of an award to the player, shown as the contents of the mini green opened safe symbol (e.g., outcome of a selected pick icon). The award may be a credit amount to be awarded to the player when the award is displayed. The award may also be enhanced by a bonus game enhancement triggered by the transformation of the red safe symbol into the red opened safe symbol. The bonus game enhancement associated with the red opened safe symbol may multiply the credit amount to award an increased credit amount to the player.

For example, a yellow coin symbol may also be displayed on the reels, activating a bonus game that displays a safe-opening animation that transforms the yellow safe symbol into a yellow opened safe symbol. The bonus game enhancement associated with the yellow opened safe symbol may display an award to the player of a jackpot progress symbol associated with a jackpot meter of the same color. A blue coin symbol may also be displayed on the reels, activating a bonus game that displays a safe-opening animation that transforms the blue safe symbol into a blue opened safe symbol. The bonus game enhancement associated with the blue opened safe symbol may display an award to the player of a number of extra picks to provide additional bonus game picks to the player.

For example, a combination of red, yellow, and/or blue coin symbols may be displayed on the reels, activating a bonus game that displays a safe-opening animation that transforms a corresponding combination of red, yellow, and/or blue safe symbols into respective red, yellow, and/or blue opened safe symbols. A bonus game may be activated that applies the bonus game enhancements associated with the combination of red, yellow, and/or blue opened safe symbols. The applicable bonus game enhancements may cause the bonus game to display an award to the player of a combination of a credit amount to be multiplied, a jackpot progress symbol, and/or an extra picks number. These examples are meant to be illustrative and the electronic gaming described herein is not limited to these examples.

The systems and methods described herein may be used in both Class II (bingo based) games, Class III (RNG based) style games, and/or other games. For example, the feature of presenting multiple metamorphics that award pick feature enhancements may be used in Class II (e.g., bingo) games and/or Class III games, as described elsewhere herein. For example, Class II bingo-style games may include pull-tab games, lotteries, punch boards, tip jars, and instant bingo, among others. In some bingo-based wagering games, a game system generates a bingo card at random and evaluates the bingo card against a randomly drawn ball call. The evaluation determines whether the player wins and, if so, determines a payout. Class III games typically include a random number generator (RNG) that can generate its own game results. Class III games include traditional non-bingo-based casino games, such as, for example, slot machines, blackjack, roulette, and craps, among others.

For example, a game outcome of a Class II (e.g., bingo) game that presents multiple metamorphics that award pick feature enhancements may be determined by comparing one or more patterns of marked (and/or "daubed") cells of a bingo card with a pay-table of winning bingo patterns. If the bingo card does not include a pattern that matches a pattern in the pay-table of winning patterns, then a losing bingo outcome is determined, and a façade (e.g., a reel spin outcome) may be displayed to the player showing no award provided to the player. If the bingo card does include a pattern that matches a pattern in the pay-table of winning patterns, then a winning bingo outcome is determined, and a façade (e.g., a reel spin outcome) may be displayed to the player showing a reward provided to the player.

Different winning patterns may be associated with different awards. The award for a winning bingo outcome may be based on an amount wagered, an associated bingo pay-table, an associated set of rules for the bingo card, a probability (and/or likelihood) of achieving a particular bingo pattern/combination, an amount of bingo numbers needed to achieve the particular bingo pattern/combination, and/or other considerations. In some examples, the player/player account may be awarded for multiple patterns (e.g., all winning patterns) that are matched when the bingo card is evaluated against the pay-table of winning patterns. In some examples, the player may be awarded for only the highest priority pattern (e.g., the highest paying winning pattern) that is matched. Other methods of play of a Class II bingo game are also envisioned and are within the scope of this disclosure.

For example, a game outcome of a Class III game that presents multiple metamorphics that award pick feature enhancements may be determined by comparing one or more patterns of symbols arrayed in a matrix on a plurality of reels with a pay-table of winning pay-lines through the matrix. If the matrix of symbols does not include a pattern that matches a winning pay-line in the pay-table of winning patterns, then a losing outcome is determined, and no award may be provided to the player. If the matrix of symbols does include a pattern that matches a winning pay-line in the pay-table of winning patterns, then a winning outcome is determined, and an award may be provided to the player. A random number generator (RNG) may randomly determine the outcome of each game.

Different winning patterns may be associated with different awards. The award for a winning outcome may be based on an amount wagered, an associated pay-table, a probability (and/or likelihood) of achieving a particular pattern, and/or other considerations. In some examples, the player/player account may be awarded for multiple patterns (e.g., all winning pay-lines) that are matched when the matrix of symbols is evaluated against the pay-table of winning patterns. In some examples, the player may be awarded for only the highest priority pattern (e.g., the highest paying winning pay-line) that is matched. Other methods of play of a Class III game are also envisioned and are within the scope of this disclosure.

As used herein, the term "base game" may refer to games initiated in response to one of a plurality of game initiation events, such as a wager or credit being received by or transferred to an EGM, as described herein. A base game may be associated with a base game outcome represented by a plurality of base game symbols or base game reels, each of which may include a plurality of base game symbols, and each of which may be selected based on an evaluation of a bingo card and ball call (e.g., in Class II games) or upon a random number generated by a random number generator (e.g., in Class III games).

Further, as used herein, the term "bonus game" may refer generally to a game or a component of a game involving procedures in addition to the base game. In some embodiments, a bonus game may be triggered from a base game and may be associated with a bonus game outcome, which may be different from the base game outcome. For example, a bonus game may be initiated after, or during, a base game and in response to the occurrence of a particular condition, such as a "trigger condition" occurring during the base game. A bonus game may result in a bonus game outcome or bonus award that increases a base game award or adds a bonus game award to a base game award.

Embodiments of the present disclosure represent a technical improvement in the field of electronic gaming. Technical improvements represented by the present disclosure include, but are not limited to including: (i) storing trigger symbols in a memory that are linked to a symbol animation that triggers a bonus game enhancement; (ii) applying one or more bonus game enhancements in varying combinations concurrently; (iii) displaying an icon matrix of a changeable size in the bonus game based on the application of one or more bonus game enhancements in varying combinations; (iv) improving the flexibility of displayed façade values for selected bonus game icons of a Class II game; (v) improving the appearance of bonus game icon value randomization for a player of a Class II game; (vi) awarding consistent rewards from a pick bonus game instead of an unknown reward potentially from a reel spin bonus game; (vii) displaying immediate reward feedback to a player for selected bonus game icons; and/or (viii) displaying potential rewards to the player for selected bonus game icons in advance based on a prior displayed multiplier value.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
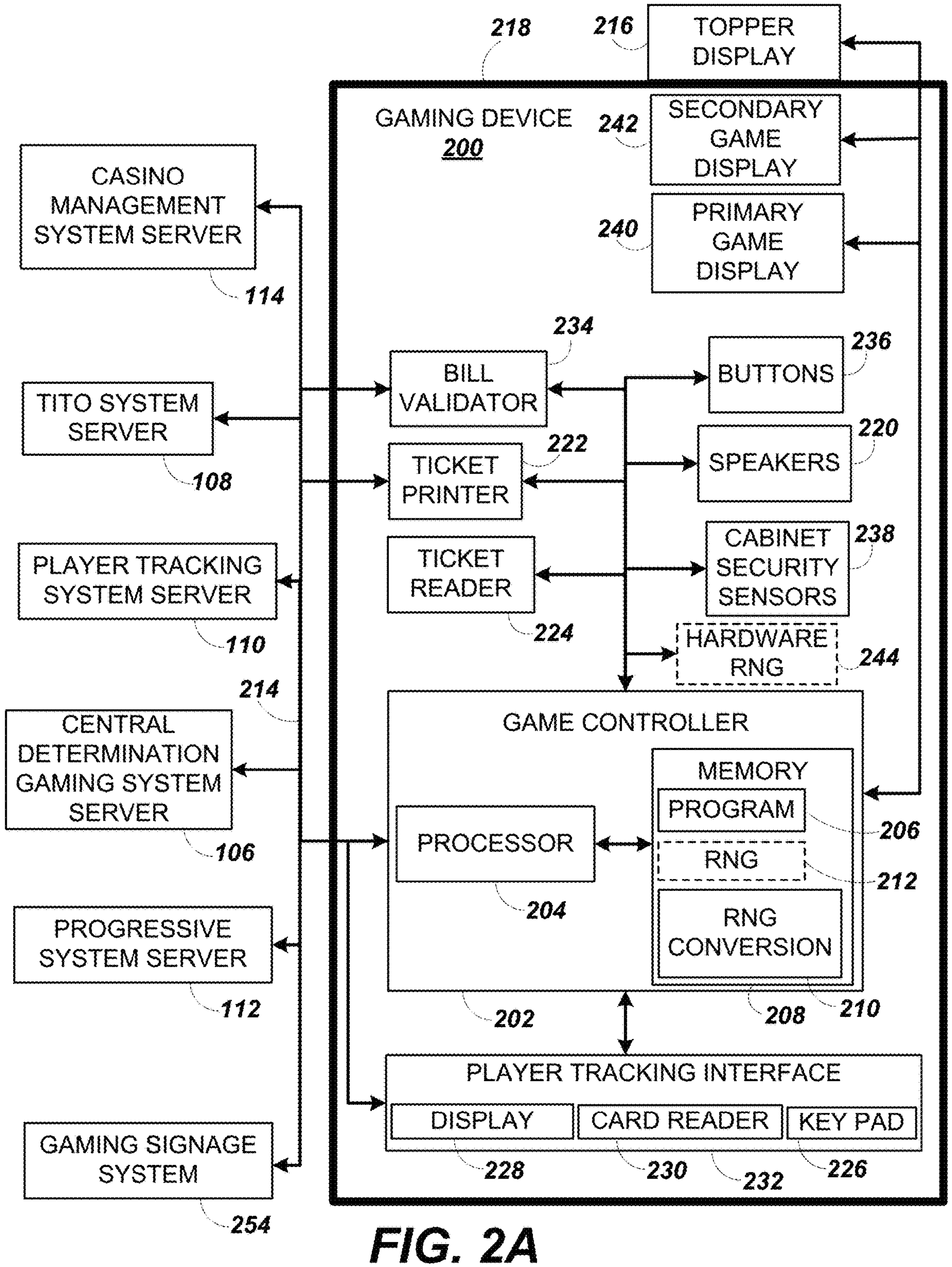
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A)

configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
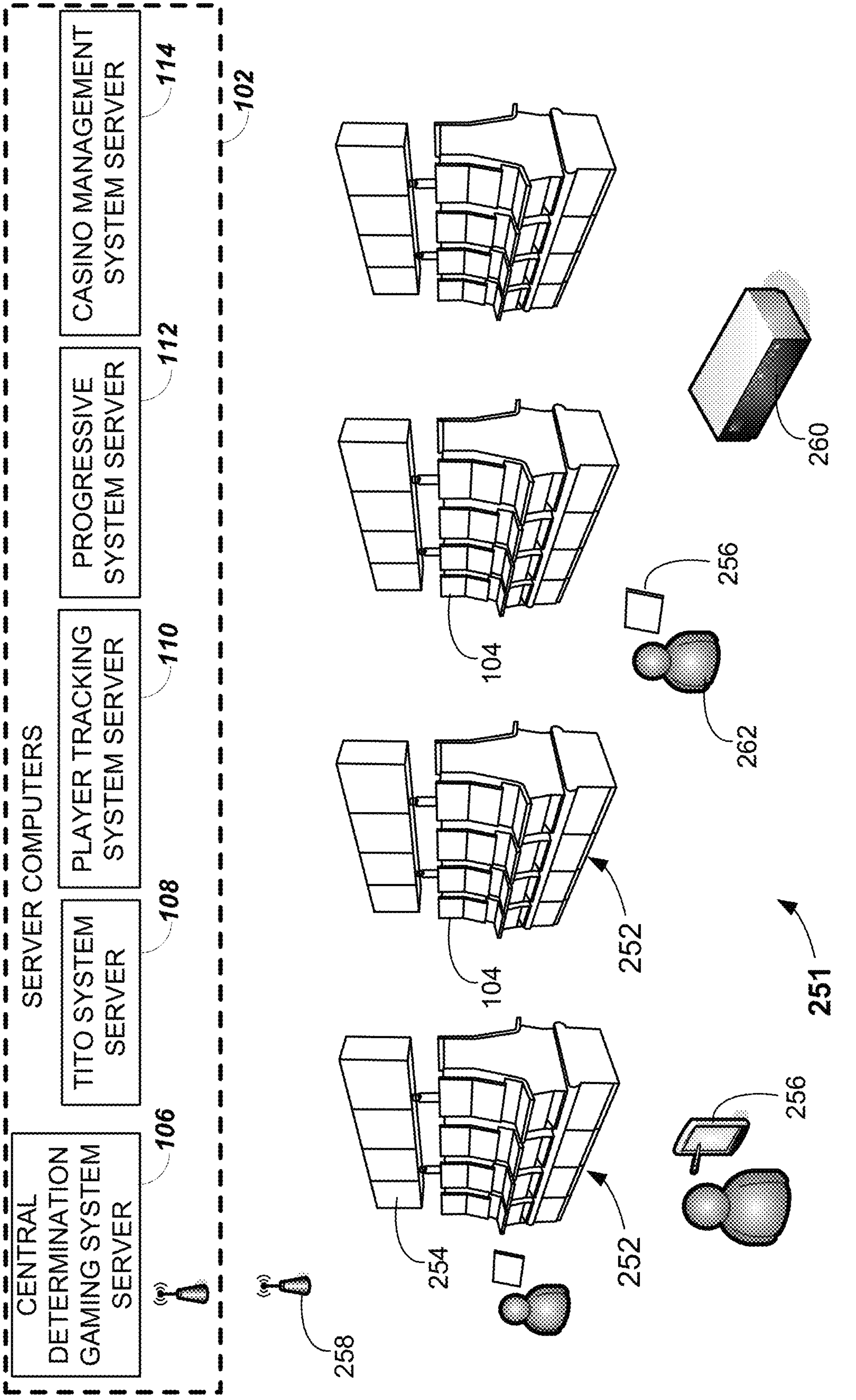
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
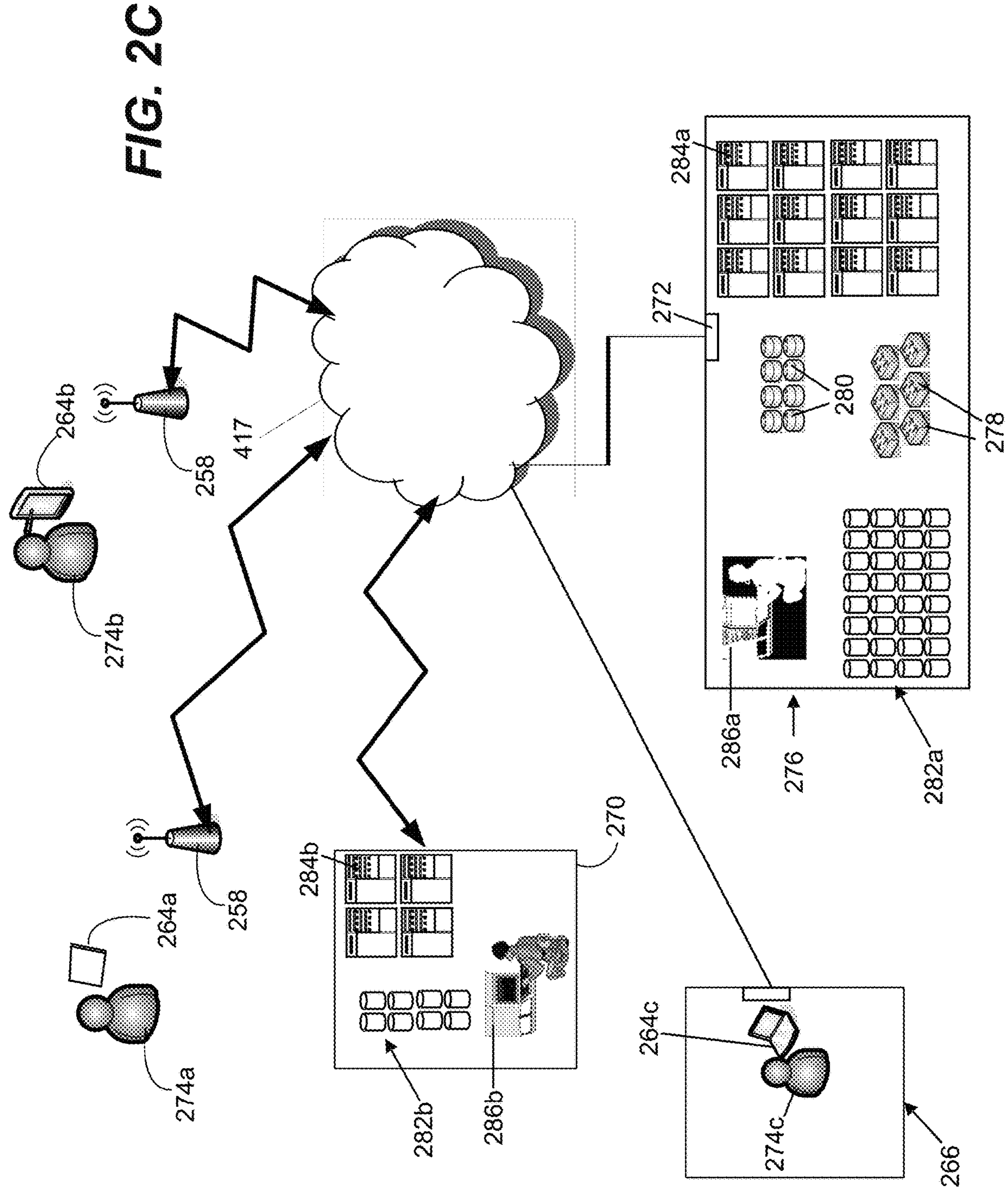
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
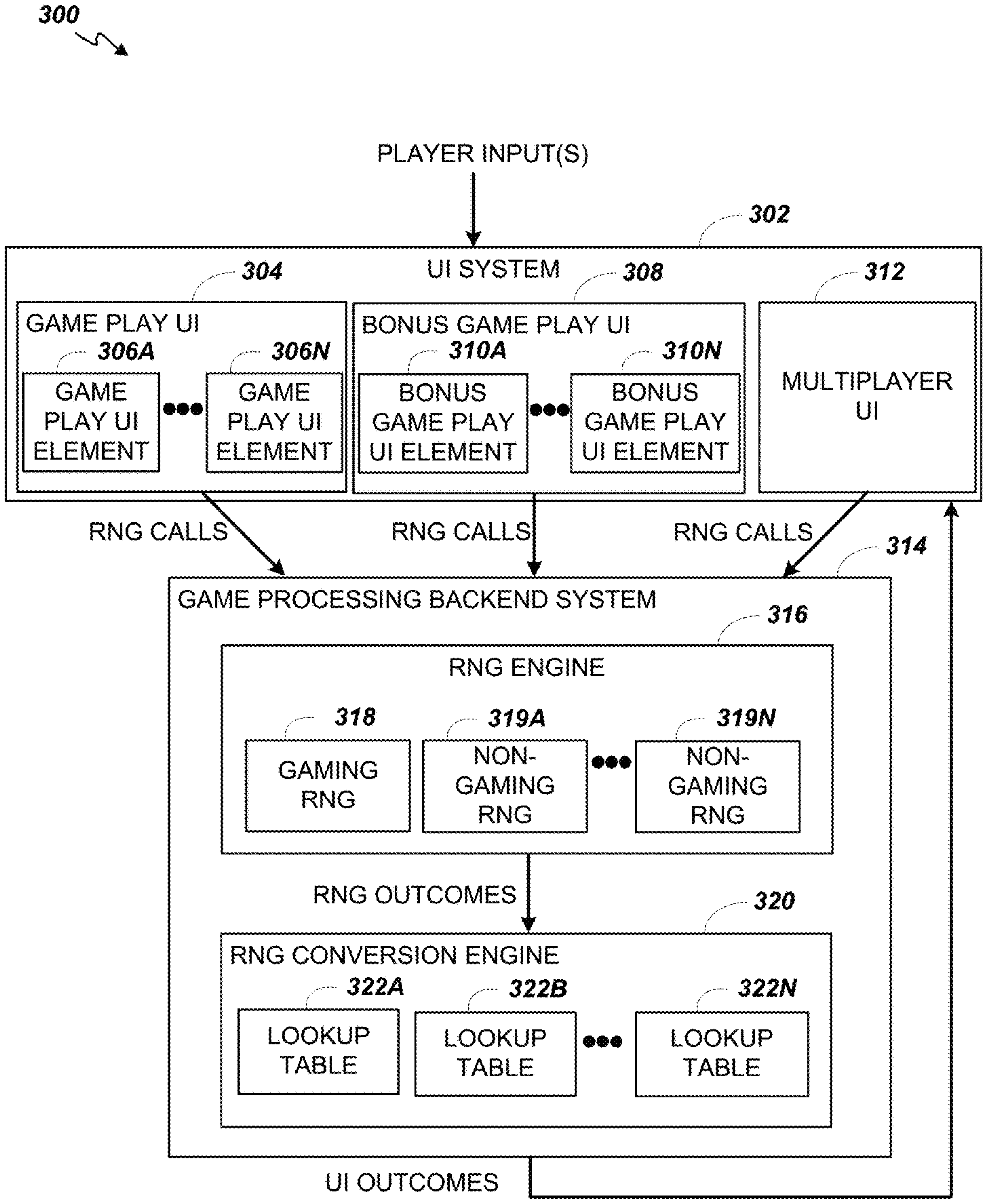
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (eg, GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
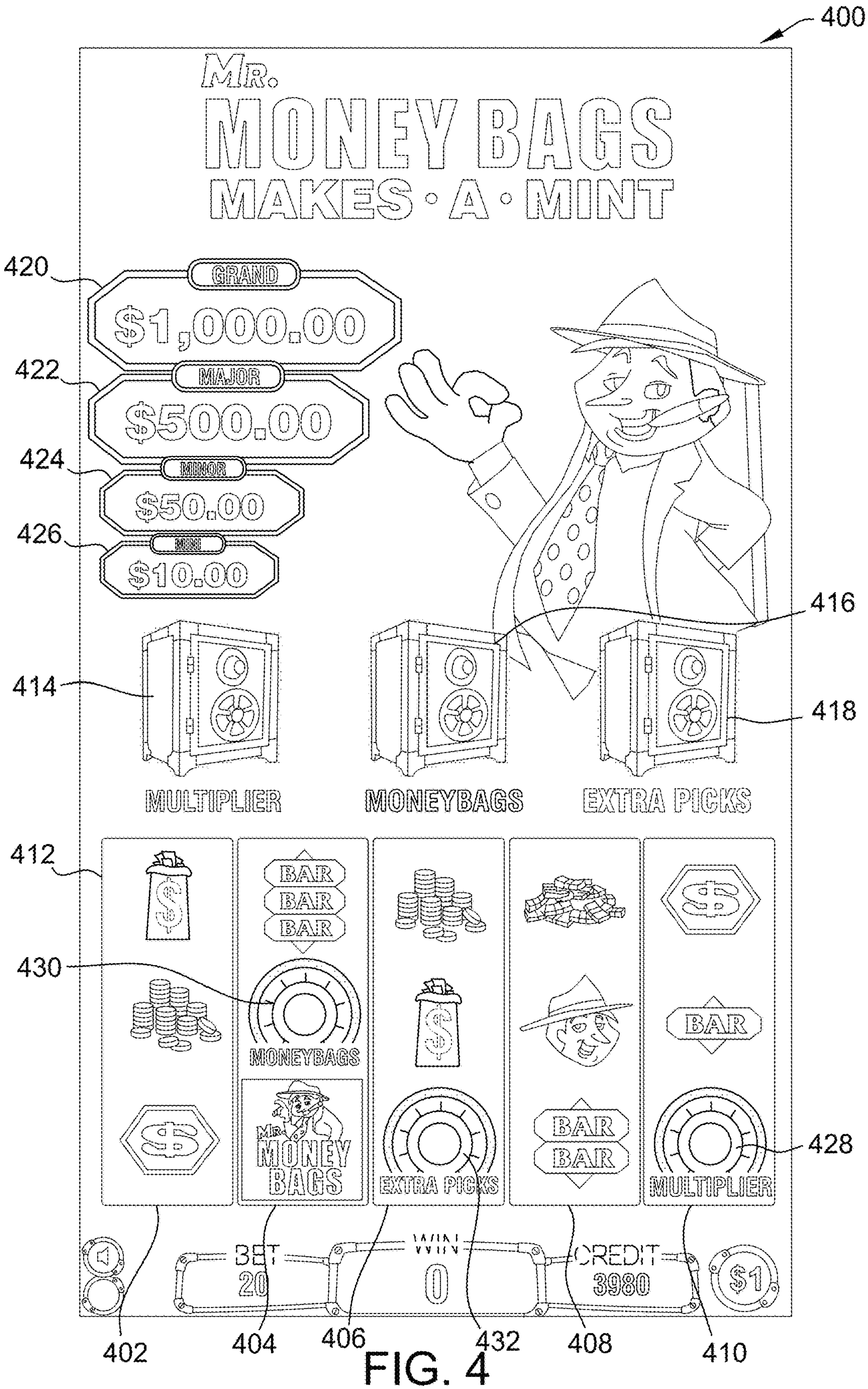
FIG. 4 is an example user interface or screenshot of a base game of an exemplary electronic game in accordance with the present disclosure.

FIG. 4 is a user interface or screenshot 400 of an example base game played on a gaming device (e.g., gaming devices 104A-104X in FIG. 1, and/or gaming device 200 and/or mobile gaming device 256 and/or EUD 264*a*-264*c* in FIG. 2). In the example of FIG. 4, the base game is a base reel game that includes display of a plurality of reels 402-410 in a primary game display area 412 (also referred to as a play area) of the gaming device. An outcome of the base game shown in FIG. 4 may correspond to (e.g., presents, represents, and/or is determined from) an output of the gaming device. The output may be a primary game outcome determined in response to a wager received from a player. In example implementations, described in further detail herein, the primary game outcome is a Class II (e.g., bingo) game outcome. In other implementations, the base reel game outcome may be and/or corresponds to an outcome of a Class III or Las-Vegas style game. In various implementations, the base game may be implemented to present an outcome of any suitable game of chance. Specific details of the type of primary game outcomes presented using the base game are not central to an understanding of the present disclosure. However, additional detail related to at least one implementation (e.g., an implementation employing the base game to present a primary bingo-based or Class II game outcome) is described below.

The base game may be initiated on a gaming device 104A-104X and 200. Specifically, a player may fund the base game via bill validator 234 and/or ticket reader 224. Once funded, the base game, which includes the first plurality of reels 402, 404, 406, 408, and/or 410, each including a plurality of symbols, may appear on the primary game display area 412. The first plurality of reels 402-410 may be physical reels and/or virtual reels. As used herein, physical reels are mechanical in nature and may be physically rotated during gameplay. In contrast, virtual reels are rendered or visually created by game controller 202 on a display, such as primary game display 240, and are merely animated to give the appearance of being spun. The first plurality of reels 402-410 of the example base game include five reels. In other examples, the number of reels may range from one reel to five or more reels in number. As shown in FIG. 4, each reel 402-410 has a plurality of symbol display positions for presenting symbols (and/or symbol combinations) which may be associated with winning and/or losing reel game outcomes and/or awards. In the example of FIG. 4, the primary game display area 412 further displays four jackpot meters 420-426, including a grand jackpot meter 420, a major jackpot meter 422, a minor jackpot meter 424, and a mini jackpot meter 426. In some examples, there may be different jackpot meters and/or more or fewer than four jackpot meters.

The base game may be played on several displays (e.g., a primary display and a secondary display of the gaming device). However, in other implementations, the base game may be played on a single display and/or on more than two displays. In the example shown in FIG. 4, the base game includes the primary game display area 412 that contains a reel matrix for display of the reels 402-410 including the plurality of symbol display positions arranged in a plurality of rows and a plurality of columns. While, in the example shown in FIG. 4, the reels 402-410 are displayed on the primary game display area 412, the reels 402-410 may appear in other locations on an EGM 104A-104X and/or on other displays, such as, for example, a secondary display, a button deck display, and the like.

In the example embodiment, the primary game display area 412 includes a 3×5 reel matrix for display of the reels 402-410 (i.e., a reel matrix having three rows and five columns). As a result, in the example embodiment, the reel matrix of the primary game display area 412 includes fifteen symbol positions. In other implementations, the reel matrix may be any size (e.g., 2×2, 3×3, 4×4, 10×10, etc.), and a number of symbol positions in the reel matrix may vary depending upon a number of rows and columns displayed. In some implementations, the reel matrix may be replaced by one or more mechanical reels, and the implementations described herein work equally well with mechanical reels as with the reel matrix. Each row of the reel matrix may be designated by a row number (e.g., "1," "2," "3," etc.). Each column of the reel matrix may be designated by a column letter (e.g., "A," "B," "C," "D," "E," etc.). Each symbol position of the reel matrix may therefore be designated by a symbol position identifier comprising a row number (e.g., "1," "2," "3," etc.) and a column letter (e.g., "A," "B," "C," "D," "E," etc.). For example, the upper-left-most symbol position, occurring at the intersection of row 1 and column A, may be designated by the symbol position identifier "1A."

As described herein, during play of the base game, symbols may be selected (e.g., such as from the first plurality of reels 402-410) and displayed in the symbol positions of each column of symbols within the primary game display area 412. Although not central to an understanding of the present disclosure, each of the first plurality of reels 402-410 may include a plurality of symbols arranged in a vertical column. A number of symbols of each reel, corresponding to the number of rows of the reel matrix of the primary game display area 412, is displayed in a column of symbol positions within the reel matrix during play of the base game. To display symbols from a reel within the reel matrix, processor 204 may simulate rotation or spinning of one or more of the plurality of reels 402-410 within a respective column. Here again, however, mechanical reels having physical reel strips may be used as well. When a respective reel is simulated to halt or stop within an associated column, one or more symbols may be displayed from the reel strip in the symbol positions of the column.

The symbols displayed after spinning and stopping each reel strip in a respective column may be referred to herein as a "reel outcome" or a "base reel game outcome" or a "base game outcome." More broadly, an "outcome" of a reel game, such as the base game shown in FIG. 4, refers to the symbols displayed in a reel matrix after reel strips are spun and stopped. Thus, a rotation and stopping of a plurality of reel strips (also referred to as a "spin and stop sequence") may be simulated by processor 204 within the columns of the primary game display area 412 to cause a reel outcome, including a plurality of symbols, to be displayed from the plurality of reel strips within the columns of the primary game display area 412.

After display of the outcome of the base game, any win conditions can be detected and any win amounts can be awarded to the player (e.g., credited to the player's credit balance). In some examples, win conditions may depend on a count of feature symbols in the reel matrix of the primary game display area 412 in the outcome. In other examples, win conditions may be defined as pay lines (also called win lines) across at least a portion of the reel matrix of the primary game display area 412. For a round of play of the base game, when a certain combination of symbols appears along a pay line, a win amount corresponding to that combination of symbols and that pay line may be awarded. Win amounts can vary according to the combination of symbols and according to the particular pay line along which the combination of symbols appears. Win amounts are typically determined according to a pay table, where the pay table comprehends the various combinations of symbols and pay lines that may occur (i.e., the win conditions). The win amount for a round of play may be a fraction of a amount wagered for that round of play for certain win conditions. For other win conditions, the win amount may be much larger than the amount wagered. The number of pay lines and base credit cost to play may vary and depends on the implementation of the base game.

Instead of evaluating win conditions on pay lines across reels in a play area, an award can be determined according to a "ways" approach. For example, all symbols displayed at symbol display positions in the play area can be used to form symbol combinations (one symbol per reel in a combination) with any of the symbols displayed at designated symbol display positions of each of the other reels. For example, in the base game shown in FIG. 4 in which there are five reels 402-410 and three symbol display positions for each reel in the primary game display area 412, each possible path through the symbol display position(s) of the respective reels provides a way to win. As a result, the total number of ways to win is determined by multiplying the number of active display position(s) of each reel 402-410, where the active display position(s) for a reel are all display positions in the play area. As a result, for five reels and fifteen display positions, there are 35=243 ways to win.

In operation, the reel outcome presented during play of the base game shown in FIG. 4 corresponds to (e.g., presents, represents, and/or is determined from) a primary game outcome. For example, the reel outcome may correspond to a primary or underlying Class II game, or the reel outcome may be determined randomly (e.g., in Class III games).

In Class III implementations, the reel outcome may be randomly determined based on an RNG outcome. To generate an RNG outcome, a random number is generated, and a lookup operation is performed for the random number in a lookup table (e.g., one or more of lookup tables 322A . . . 322N in FIG. 3), to map the random number to an outcome that corresponds to a reel outcome for the base game. The RNG outcome may be generated by the RNG engine 316 which uses the gaming RNG 318 to generate one or more random numbers, which are passed to the RNG conversion engine 320, and the RNG conversion engine 320, using one or more of the random number(s) and one or more of the lookup tables 322A . . . 322N, determines an RNG outcome corresponding to the reel outcome. The game controller 202 (e.g., via the processor 204) may then cause display of the randomly determined reel outcome on the primary game display area 412.

In some example implementations, the reel outcome of the base game corresponds to (e.g., presents, represents, and/or is determined from) a Class II (e.g., bingo) game outcome. In some Class II implementations, a player and/or a gaming device (e.g., gaming devices 104A-104X and 200) may be provided with a bingo card, such as by a bingo gaming system server (e.g., the server 106). For example, a player may be provided a new bingo card each time a "Spin" or "Play" button is pressed by the player (e.g., via user interface), provided the player has made a wager. In some examples, more than one bingo card may be generated in response to wager. A bingo number listing (also referred to as a "ball call") may be randomly generated, such as by bingo gaming system server 106. The bingo card may be compared to the current bingo number listing, and numbered cells on the bingo card that match numbers in the bingo number listing may be marked or "daubed" on the bingo card. Finally, the marked or daubed bingo card may be evaluated against a paytable of winning bingo patterns.

The bingo number listing may be continually generated until a maximum amount of numbers are listed (e.g., seventy-five numbers listed) or until a game-ending pattern is awarded to a player participating in the bingo game. A typical game-ending pattern may be a bingo card blackout pattern, in which each of the numbers of a bingo card match a number displayed in the bingo number listing. Other game-ending patterns are also possible. When the game-ending pattern is awarded, the bingo number listing is reset, and the process repeats. In some examples, a single play of the bingo game includes a wager, a bingo card, a bingo number listing, a matching of the numbers called with those on a bingo card, a determination of a bingo game outcome, and a presentation of an associated award, if any. As described herein, the presentation of the associated award is implemented using the base game and, if conditions are satisfied by the award, a bonus game, such as the bonus game described in more detail below with reference to FIGS. 5-7.

To determine a bingo game outcome, the bingo card may be daubed by the game controller 202 (e.g., via the processor 204) based upon a list of numbers included in the ball call. Once the bingo card is daubed, the game controller 202 may compare the numbers daubed on the bingo card to every winning pattern in a database of winning patterns to determine one or more winning outcomes of the bingo game outcome. As those of skill will appreciate, the number of winning patterns may be determined based upon the ball call. The daubed bingo card may also be displayed (e.g., within or adjacent to the primary game display area 412), such as, for example, by highlighting each daubed number, and the ball call may be displayed as well. Moreover, a table or database of winning patterns may be stored in a computer memory of any of EGMs 104A-104X or 200, such as memory 208, which may be a tangible, non-transitory, computer-readable memory. If the daubed bingo card does not include a pattern that matches a pattern in the database of winning patterns, then a losing bingo outcome is determined, and no award may be provided or presented to the player. If the bingo card does include a pattern that matches a pattern in the database of winning patterns, then a winning bingo outcome is determined, and an award may be presented to the player, as described herein.

The bingo game outcome may, in some instances, include a plurality of winning patterns. Different winning patterns may be associated with different awards. The award for a winning bingo game outcome may be based on an amount wagered, an associated bingo game paytable, an associated set of rules for the bingo game, a probability (and/or likelihood) of achieving a particular bingo pattern/combination, an amount of bingo numbers needed to achieve the particular bingo pattern/combination, and/or other considerations. In some examples, the player may be awarded for multiple patterns (e.g., all winning patterns) that are matched when the daubed bingo card is evaluated against the database of winning patterns. In some examples, the player may be awarded for only the highest priority pattern (e.g., the highest paying winning pattern) that is matched. In some examples, during play of a Class II game, a player is provided or selects a single bingo card for multiple plays of the bingo game, with a new bingo number listing generated for each play of the bingo game. Other methods of play of a Class II bingo game are also possible and are within the scope of this disclosure.

The bingo game outcome may be presented to the player via a spinning reel game simulation. That is, for each play of the bingo game, the bingo game outcome is presented as a reel outcome or a sequence of reel outcomes in a reel game. In the example shown in FIG. 4, a bingo game outcome may be presented by the base game as a simulated spin and stop sequence or multiple simulated spin and stop sequences of the plurality of reels 402-410. The spin and stop sequence(s) and associated outcome(s) of a reel game (e.g., the base game shown in FIG. 4) that present the bingo game (or another Class II game) outcome may also be referred to as a "façade" or a "script." A table or database may be stored in a computer memory of any of EGMs 104A-104X or 200 and/or the server 102, such as memory 208, that associates bingo game outcomes with façades for presenting the bingo game outcomes. The game controller 202 (e.g., via the processor 204) may thereby query the table or database to identify façades, which each contain one or more spin and stop sequence(s) and associated outcome(s) of the reel game, to present a bingo game outcome.

The processor 204 may randomly select from multiple façades identified for a given bingo game outcome. For example, for a given bingo game outcome, a number of façades, e.g., five, ten, fifteen, or any other number of different ways (façades), may exist and be stored in the table or database to present the bingo game outcome. A façade may be randomly selected from multiple identified façades for a given bingo game outcome, for example, based upon an RNG outcome generated in response to a random number provided by the RNG 212. When a façade is selected by the processor 204 to present a bingo game outcome, the processor 204 may control the reel game to present the one or more spin and stop sequence(s) and associated outcome(s) contained in the façade.

In the example implementation, for a given bingo game outcome, the processor 204 selects a façade for presenting the bingo game outcome. For example, the processor 204 may perform a lookup operation that identifies façade(s) capable of presenting the bingo game outcome and selects a façade based on a generated RNG outcome. Based on the selected façade, the processor 204 controls the base game shown in FIG. 4 to cause display of one or more spin and stop sequences of the plurality of reels 402-410 and the associated outcome(s) of the base game. One or more combinations of symbols and/or one or more special symbol types in the outcome of the base game may be associated with an award value that is equal to an award value of the bingo game outcome. Similarly, a losing bingo game outcome may be displayed as a losing outcome of the base game (e.g., no winning symbol combinations or winning special symbol types are displayed).

To illustrate, the base game may be initiated in response to a bingo game outcome that includes a winning pattern having an award value of 200 credits. The processor 204 queries the table or database to identify façades for presenting the winning pattern and/or the award value as one or more spin and stop sequences of the plurality of reels 402-410 and the associated outcome(s) of the base game. The processor 204 then selects one of the identified façades for the bingo game outcome and initiates a play of the base game. For example, the processor 204 may select one of the identified façades based on a generated RNG outcome that is mapped to the identified façades. During the base game, based on the selected façade, the processor 204 causes the first plurality of reels 402-410 to spin and stop to display a combination of symbols that include a winning symbol combination corresponding to a 200 credit award value that matches the award value of the winning bingo game outcome. The award value is then displayed in a win meter and subsequently added to a credit meter.

Figure 5:
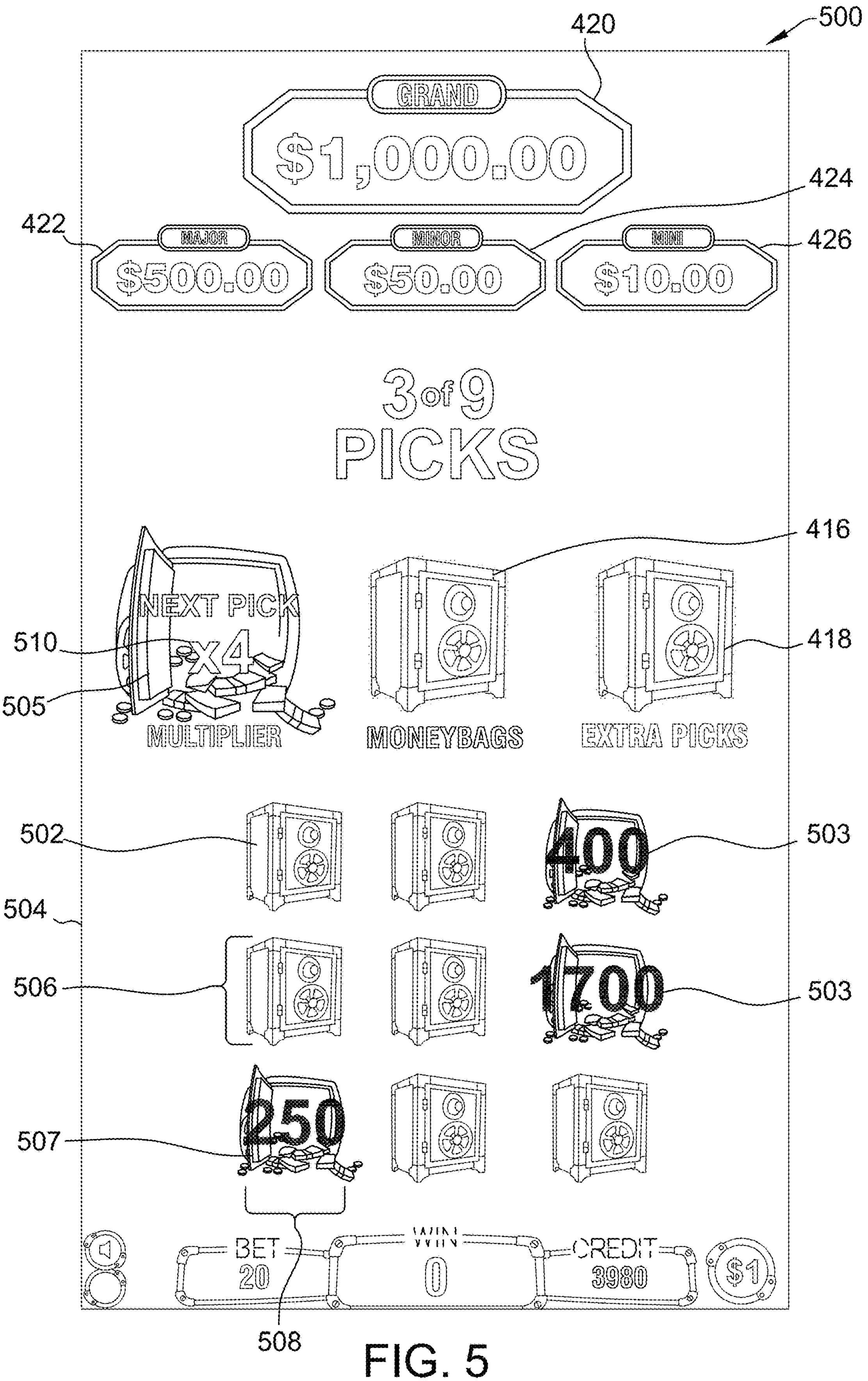
FIG. 5 is an example user interface or screenshot of one embodiment of a bonus game of the exemplary electronic game in accordance with the present disclosure.
Figure 6:
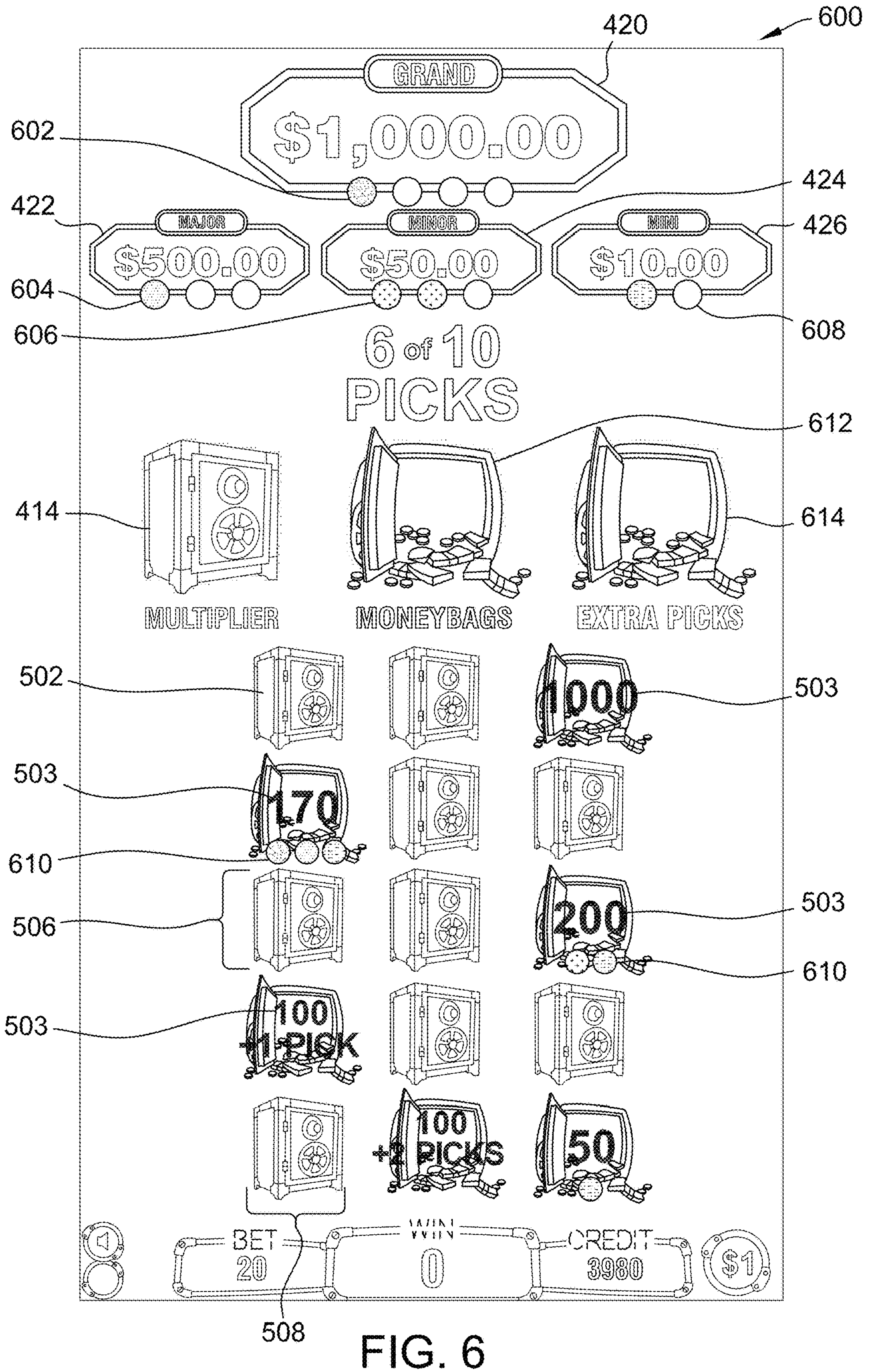
FIG. 6 is an example user interface or screenshot of another embodiment of the bonus game of the exemplary electronic game shown in FIG. 5.
Figure 7:
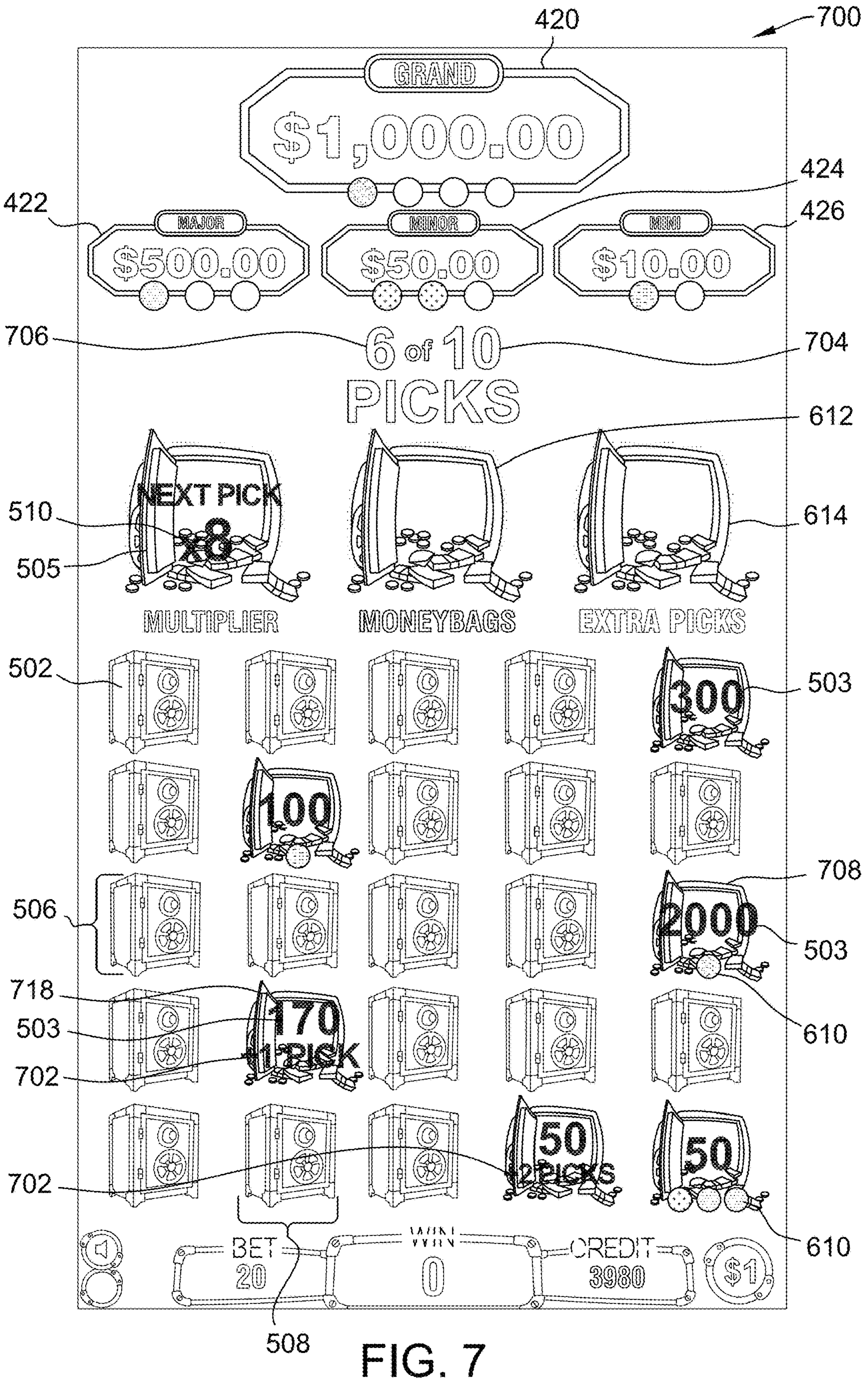
FIG. 7 is an example user interface or screenshot of yet another embodiment of the bonus game of the exemplary electronic game shown in FIG. 5.

With additional reference to FIGS. 5-7, a bonus game may be triggered by the outcome of the base game satisfying a bonus game condition. In the example implementation, the bonus game is a pick feature game that includes a plurality of pick icons 502 displayed in a secondary game display area 504 of a gaming device (e.g., gaming devices 104A-104X, 256, and/or 264*a*-264*c*). The plurality of pick icons 502 may be arranged in a matrix (e.g., pick icon matrix) including rows 506 and columns 508. In the illustrated example, the pick icons 502 are in the shape of a closed safe. In some examples, pick icons 502 may be a different shape. The bonus game described with reference to FIGS. 5-7 may also be referred to herein as a bonus pick feature game or a pick feature game. In example implementations, the bonus game is initiated after play of the base game and in response to the outcome of the base game satisfying the bonus game condition. However, the functionality described herein with respect to the pick feature game may be implemented in any base game as well as in any bonus game. Moreover, the bonus game is not limited to a pick feature game, and may be implemented as another suitable wagering game.

During the bonus pick feature game, the pick icons 502 are displayed in the secondary game display area 504 and are selected by a player. The number of selections available during the bonus game may be restricted to a lower number than the number of pick icons 502 displayed. Each pick icon 502 is associated with a pick icon award value 503 (also referred to as a pick award value 503 or a pick prize value 503). The pick icon award value 503 associated with a selected pick icon 502 may be revealed immediately after the pick icon 502 is selected, or the pick icon award values 503 of all selected pick icons 502 may be revealed after no available selections remain. After the bonus pick feature game is complete, the total award value associated with the pick icon award values 503 of the selected pick icons 502 is disbursed to the player. Each pick icon 502 may be associated with a winning outcome (i.e., an award value 503 that is greater than zero), or one or some of the pick icons 502 may be associated with a losing outcome (i.e., an award value 503 of zero). The award value 503 of the pick icons 502 may also be referred to as an outcome of the pick icon 502 or a pick icon outcome.

The bonus pick feature game is triggered in response to a game controller (e.g., the game controller 202) determining that a bonus game condition is satisfied by the base game outcome. In Class II bingo game implementations, the bonus game condition may be a predefined or preselected number of winning bingo patterns included in the bingo game outcome. The game controller 202 may identify and translate the number of winning patterns occurring on the bingo card to a number of pick icons 502, a number of available pick selections, and/or an award value 503 associated with each selected pick icon 502 in the bonus pick feature game. For example, if a number n winning patterns are identified on the bingo card, the game controller 202 may award a number n of pick icons 502 and/or pick selections during the bonus game and/or may award a number n of winning outcomes for selected pick icons 502. Likewise, the game controller 202 may not trigger the bonus game until the number of winning patterns exceeds a predefined or preselected number of winning patterns (e.g., two or more winning patterns). To this end, the game controller 202 may, in some implementations, count, or determine a number of, pick icons 502, available pick selections, and/or award values 503 associated with the pick icons 502 during the bonus game.

In various implementations, a bonus game condition may include any suitable trigger condition, such as, for example, generation by RNG 212 of an RNG outcome (e.g., a random number within a range of random numbers) and performing a lookup operation to map the random number to a decision as to whether the bonus game condition is satisfied. The RNG outcome for mapping to the decision as to whether the bonus game condition is satisfied may be generated after each play of the base game, or may itself be randomly generated based on an additionally generated RNG outcome (e.g., a randomly generated outcome of the base game may in turn generate an RNG outcome to determine whether the bonus game is triggered). Additionally and/or alternatively, in a Class III implementation, the bonus game condition may be satisfied when a preselected or predefined symbol combination and/or a preselected or predefined symbol type (e.g., a special symbol) is displayed on the first plurality of reels 402-410 in an outcome the base game. For example, a symbol combination and/or symbol type associated with a game award that is greater than or equal to a predetermined award value may satisfy the bonus game condition. In some implementations, a preselected or predefined symbol combination and/or symbol type being displayed in an outcome of the base game may generate an RNG outcome that is mapped to a decision as to whether the bonus game condition is satisfied.

In some implementations, and as described in additional detail herein, the bonus game condition may be satisfied when a number of winning patterns in a primary Class II game (e.g., a bingo game) exceeds a predefined or preselected number of winning patterns. In other Class II implementations, the bonus game condition may be satisfied when an award associated with a bingo winning pattern is greater than or equal to a predetermined award value and/or when the predetermined award value is capable of being partitioned into or distributed across a predefined or preselected number of winning pick feature game outcomes. It will, however, be appreciated that these bonus game conditions are described by way of example only and that other bonus game conditions may be implemented as well.

When the bonus pick feature game is triggered, the game controller 202 may award one or more pick selections of the pick icons 502 displayed in the secondary game display area 504. The number of pick selections awarded may be based upon any suitable criterion or group of criteria, such as, for example, the value of the random number generated by RNG 212, the symbol combination occurring on reels 402-410 in an outcome of the base game, and the like.

Additionally and/or alternatively, when the bonus pick feature game is triggered, the game controller 202 may determine the award value 503 associated with each pick icon 502 that is revealed and awarded to a player when the pick icon 502 is selected. The award value 503 associated with each pick icon 502 may be determined based upon any suitable criterion or group of criteria. In Class III implementations, the award value 503 associated with each pick icon 502 may be randomly determined, for example, by performing a lookup operation in a weighted table or paytable associated with the pick feature game using a random number generated by RNG 212. The number of available pick selections and/or pick icons 502 during the bonus pick feature game may be predetermined or randomly determined when the bonus game is triggered in conjunction with randomly determining the award value 503 associated with each pick icon 502. Each pick icon 502 may be associated with an award value 503 that is greater than zero (i.e., each selected pick icon 502 results in a winning outcome with some payout to the player), or one or some of the pick icons 502 may be associated with an award value 503 of zero (i.e., one or some of the selected pick icons 502 may result in a losing outcome).

In Class II implementations, the number of pick selections and/or the award value 503 associated with the pick icons 502 may correspond to a number of segments or partitions of a subdivided bingo game award. For example, when the bonus game condition is satisfied by a bingo game award of sufficient value (as described above), the bingo game award may be subdivided into a plurality of smaller awards, each of which may be associated with an award value 503 of a pick icon 502. As an example, a bingo game award of 1,000 credits may be subdivided into eight smaller awards, e.g., of 125 credits each. In other examples, the eight awards may be of different, i.e., unequal, amounts. Each of the eight smaller awards may be associated with an individual pick icon award value 503, and each of these individual pick icon award values 503 may provide or award one of the eight smaller awards.

Moreover, in Class II implementations, an award value 503 associated with each selected pick icon 502 (also referred to as a pick icon award value 503) of the bonus game may correspond to an award value associated with a winning bingo pattern. The game controller 202 may determine or identify (e.g., by querying a table or database stored in a memory as described below) a pick icon award value 503 based upon the corresponding winning game outcome or award of the bingo game outcome. For example, for a winning bingo pattern having an award of 100 credits (e.g., determined based upon a bingo paytable), the game controller 202 may assign the corresponding selected pick icon 502 an award value 503 of 100 credits. Thus, each pick icon 502 selected during the bonus game may display a winning outcome, and an award value 503 of each selected pick icon 502 may correspond to an award value associated with the winning bingo pattern (or more broadly, a winning game outcome) mapped or corresponding to the pick icon 502.

In some Class II implementations, the bonus game is simulated in conjunction with the base game as a façade for presenting a bingo game outcome that satisfies the bonus game condition. As described above, a table or database may be stored in a computer memory of any of EGMs 104A-104X or 200 and/or the server 102, such as memory 208, that associates bingo game outcomes with façades for presenting the bingo game outcomes, and the game controller 202 (e.g., via the processor 204) may query the table or database to identify façades to present a bingo game outcome. For certain bingo game outcomes, for example, those that include a predefined or preselected number of winning patterns and/or one or more winning patterns associated with a certain award value, one or more façades may exist that present the bingo game outcome as outcomes of the base game and one or more pick icon award values 503 revealed during the pick feature game. These bingo game outcomes satisfy the bonus game condition as they are able to be presented by one or more façades that contain outcome(s) of the base game and outcome(s) of one or more selected pick icons 502 of the bonus game. The processor 204 may select (e.g., based on a generated RNG outcome) a façade for presenting the bingo game outcome that satisfies the bonus game condition and, based on the selected façade, the processor 204 causes display of one or more spin and stop sequences of the plurality of reels 402-410 and the associated outcome(s) of the base game and the award values 503 of one or more selected pick icons 502 during the bonus game. One or more combinations of symbols and/or one or more special symbol types in the outcome of the base game and the pick icon award values 503 during bonus game may be associated with an award value that is equal to an award value of the bingo game outcome.

Where the pick icon award values 503 are presented during the bonus game as a façade for a bingo game outcome, the reveal order of the pick icon award values 503 of selected pick icons 502 may be predetermined or random. For a predetermined order of pick icon award values 503 of selected pick icons 502, the pick icon award values 503 will be successively displayed as selections of pick icons 502 are made, regardless of the location of the selected pick icons 502 in the matrix. This provides a perception of randomization, although the underlying outcomes of the selected pick icons 502 and the order in which they are revealed are predetermined. Moreover, for a predetermined reveal order of the pick icon award values, the award value revealed for each successive pick icon selection may increase incrementally (e.g., as determined by the selected façade). For a random order of pick icon award values 503, each of the values may be predetermined but the reveal order is not, and the award values 503 may be displayed at random as the pick icons 502 are selected. For example, for a given bonus game façade for presenting a bingo game outcome, eight pick selections may be available during the bonus game and the pick icon award values 503 for presenting the bingo game outcome are predetermined, but the order at which the award values 503 are revealed is randomly determined for each pick selection. For example, after each pick icon selection, an RNG outcome may be generated to determine the pick icon award value 503 to present for that selected pick icon 502. After a pick icon award value 503 is revealed, it is removed from the pool of remaining award values 503 from which the subsequent award value 503 to be revealed is randomly selected, to ensure that each predetermined award value 503 is revealed.

In both Class II and Class III implementations, the bonus pick feature game may be provided with one or more pick feature enhancements that are triggered during the base game in conjunction with the bonus game being triggered. The pick feature enhancements facilitate increasing the variability and flexibility in presenting winning outcomes during the bonus pick feature game, for example, but increasing the award values 503 of the selected pick icons 502, increasing the number of available selections during the pick feature game, and/or increasing the available awards during the pick feature game. In the example implementations described herein, the pick feature enhancements of the bonus game include an award multiplier enhancement, a jackpot enhancement, and an extra picks enhancement, which are described in further detail below. During the bonus pick feature game, one or any combination of two or more of the pick feature enhancements may be applied. Although the pick feature enhancements are described with respect to an award multiplier enhancement, a jackpot enhancement, and an extra picks enhancement, the bonus pick feature game may include any suitable pick feature enhancement.

As described above, the bonus pick feature game is triggered in response to the game controller 202 (e.g., via the processor 204) determining that the base game outcome satisfies a bonus game condition (e.g., randomly determined based on a generated RNG outcome in Class III implementations or based on a preselected or predetermined number of winning patterns included in and/or a total award value of a bingo game outcome in Class II implementations). The bonus pick feature game having one or more pick feature enhancements is triggered in response to the game controller 202 further determining that the base game outcome also satisfies an enhancement condition.

In various Class III implementations, an enhancement condition may include any suitable trigger condition, such as, for example, generation by RNG 212 of an RNG outcome and performing a lookup operation to map the random number to a decision as to whether the enhancement condition is satisfied. The RNG outcome for mapping to the decision as to whether the enhancement condition is satisfied may be generated after each play of the base game, or may itself be randomly generated based on an additionally generated RNG outcome. The RNG outcome for determining whether the enhancement condition is satisfied may be generated in conjunction with determining whether the bonus game condition is satisfied (e.g., a single RNG outcome may be utilized to determine whether each condition is satisfied) or may be an additional RNG outcome generated in response to the bonus game condition being satisfied. Additionally and/or alternatively, in a Class III implementation, the enhancement condition may be satisfied when a preselected or predefined symbol combination and/or a preselected or predefined symbol type (e.g., a special symbol) is displayed on the first plurality of reels 402-410 in an outcome the base game. A preselected or predefined symbol combination and/or symbol type may satisfy both the bonus game condition and the enhancement condition, or different symbol combinations and/or symbol types may independently satisfy the bonus game condition and the enhancement condition. In some implementations, a preselected or predefined symbol combination and/or symbol type being displayed in an outcome of the base game may generate an RNG outcome that is mapped to a decision as to whether the enhancement condition is satisfied. The lookup tables utilized for lookup operations performed using generated RNG outcomes to determine whether the enhancement condition is satisfied and/or to determine outcomes of the base game that determine whether the enhancement condition is satisfied may suitably be weighted to control randomness and payout volatility by controlling the overall "hit rate" of the enhancement condition being satisfied.

In various Class II implementations, an enhancement condition may be satisfied if the game controller 202 (e.g., via the processor 204) determines that an outcome of the primary Class II game can be presented as outcome(s) of selections of the pick feature game having one or more pick feature enhancements. The determination of whether an enhancement condition is satisfied by the bingo game outcome may be performed during or after determining that a bonus game condition is satisfied to trigger the pick feature game. In particular, during or after determining that a bonus game condition is satisfied by the primary game outcome, the processor 204 may determine that one or more winning combinations of the primary game outcome satisfy the bonus game condition and determine whether outcome(s) of one or more selections of the bonus pick feature game having one or more pick feature enhancements may be presented that correspond to the one or more winning combinations.

As described above, in some Class II implementations, the bonus pick feature game is simulated in conjunction with the base game (shown in FIG. 4) as a façade for presenting a bingo game outcome that satisfies the bonus game condition. The enhancement condition is satisfied where the bingo game outcome is associated with one or more façades that present the bingo game outcome as outcomes of the base game and winning outcome(s) of one or more pick icon selections made during the bonus pick feature game having one or more pick feature enhancements. As described above, the façades may be stored in a table or database in a computer memory of any of EGMs 104A-104X or 200 and/or the server 102, such as memory 208, and the game controller 202 (e.g., via the processor 204) may query the table or database to identify façades that contain one or more pick award values 503 of a pick feature game having one or more pick feature enhancements. The processor 204 may query the same or a different database or table to identify façades that contain one or more outcomes of the base game for the bingo game outcome, façades that contain one or more pick award values 503 of a pick feature game without a pick feature enhancement, and façades that contain one or more one or more pick award values 503 of a pick feature game having one or more pick feature enhancements. If the processor 204, based on the query, maps the bingo game outcome to one or more façades containing one or more pick award values 503 of a pick feature game having one or more pick feature enhancements, the processor 204 may determine that the associated enhancement condition is satisfied by the bingo game outcome. The processor 204 may select a façade for presenting the bingo game outcome that satisfies the bonus game condition and the enhancement condition and, based on the selected façade, the processor 204 causes display of one or more spin and stop sequences and the associated outcome(s) of the base game and one or more one or more pick award values 503 of a pick feature game having one or more pick feature enhancements. If no pick award values 503 of a pick feature game, with or without a pick feature enhancement, exist for the winning patterns, the processor 204 may present the winning patterns as one or more outcomes of the base game (e.g., for a given bingo game outcome, only façades that contain one or more outcomes of the base game may be identified and selected from).

In some implementations, façades may be stored that contain a sequence of spins and outcomes of the base game and one or more pick award values 503 associated with pick icons 502 selected during the bonus pick feature game (with or without pick feature enhancement(s)) for presenting each of the winning patterns. That is, façades may exist that contain a sequence of spins and outcomes of the base game, one or more pick award values 503 of the bonus pick feature game without a pick feature enhancement, and/or one or more pick award values 503 of the bonus pick feature game having one or more pick feature enhancements for presenting all the winning patterns. In these implementations, the processor 204 may select a single façade to present the bingo game outcome.

To illustrate, in an example where the bingo game outcome includes multiple winning patterns associated with a 10 credit, a 100 credit, and a 1000 credit pattern win, the processor 204 may query the table or database to identify façades for presenting each of the winning patterns and/or the award value(s) as one or more spin and stop sequences and the associated outcome(s) of the base game and, optionally, one or more pick award values 503 of the bonus pick feature game with or without one or more pick feature enhancements. For example, one or more façades may exist that contain a spin and stop sequence and associated outcome of the base game for presenting the 10 credit pattern win and one or more pick award values 503 of the bonus pick feature game with or without one or more pick feature enhancements for presenting the 100 credit pattern win and the 1000 credit pattern win. Façades may also exist that contain one or more pick award values 503 of the bonus pick feature game without a pick feature enhancement for presenting the 100 credit pattern win, and one or more pick award values 503 of the bonus pick feature game having one or more pick feature enhancements for presenting the 1000 credit pattern win. Additionally and/or alternatively, one or more façades may exist that contain one or more spin and stop sequences and associated outcome(s) of the base game for presenting the 10 credit pattern win and the 100 credit win, and one or more pick award values 503 of the bonus pick feature game with or without one or more pick feature enhancements for presenting the 1000 credit pattern win. The processor 204 then selects (e.g., randomly selects based upon a random number provided by the RNG 212) one of the identified façades for the bingo game outcome and, in response and based on the selected façade, the processor 204 causes display of the sequence of spins and outcomes of the base game, and one or more pick award values 503 of the bonus pick feature game with or without one or more pick feature enhancements for presenting the winning patterns of the bingo game outcome.

In some implementations, façades may be stored that contain one or more spins and outcomes of the base game and/or one or more pick award values 503 of the bonus pick feature game with or without one or more pick feature enhancements for presenting a single winning pattern of a bingo game outcome. In these implementations, the processor 204 may separately select a façade for each winning pattern of the bingo game outcome to be presented. The processor 204 may identify the façades containing one or more pick award values 503 of the bonus pick feature game with pick feature enhancements that are common between the winning patterns of the bingo game outcome. For each winning pattern, the processor 204 may randomly select, from the identified façades, a façade that contains one or more pick award values 503 of the bonus pick feature game having the common pick feature enhancement(s). The processor 204 may then initiate the bonus pick feature game having the pick feature enhancement(s) commonly triggered by the winning patterns of the bingo game outcome and cause display of the randomly selected façade(s). If no façades that contain one or more pick award values 503 of a bonus pick feature game having common pick feature enhancement(s) exist in the table or database for the winning patterns of the bingo game outcome, the processor 204 may initiate the bonus pick feature game without a pick feature enhancement. Alternatively, the processor 204 may present one of the winning patterns of the bingo game outcome (e.g., a winning pattern associated with a smaller award value) as an outcome of the base game and/or an outcome of the bonus pick feature game without a pick feature enhancement, and present another one of the winning patterns (e.g., a winning pattern associated with a larger award value) as one or more pick award values 503 of the bonus pick feature game with one or more pick feature enhancements To illustrate, returning to the example where the bingo game outcome includes multiple winning patterns associated with a 10 credit, a 100 credit, and a 1000 credit pattern win, the processor 204 may query the table or database to separately identify façades for presenting each of the 10 credit pattern win, the 100 credit pattern win, and the 1000 credit pattern win. That is, the processor 204 separately identifies one or more façades for presenting each of the 10 credit pattern win, one or more façades for presenting the 100 credit pattern win, and one or more façades for presenting the 1000 credit pattern. In some examples, the façades identified for the 10 credit pattern win may only contain spins and associated outcomes for the base game, and façades may be identified for the 100 credit pattern and 1000 credit pattern wins that contain one or more pick award values 503 of the bonus pick feature game with one or more pick feature enhancements. The processor 204 may initially and separately identify subsets of the façades for presenting the 100 credit pattern win and subsets of the façades for presenting the 1000 credit pattern win that contain one or more pick award values 503 of the bonus pick feature game having common pick feature enhancement(s). For example, if façades are identified for the 100 credit pattern win and the 1000 credit pattern win that contain one or more pick award values 503 of the bonus pick feature game having a jackpot enhancement, the processor 204 would identify these façades for each of the 100 credit pattern win and the 1000 credit pattern win as a subset.

The processor 204 then may randomly select a subset of the façades for each of the 100 credit pattern win and the 1000 credit pattern win and, from the randomly selected subset, randomly select a façade for each of the 100 credit pattern win and the 1000 credit pattern win. In some instances, the identified façades for the 100 credit pattern win and the 1000 credit pattern win may not contain one or more pick award values 503 of the bonus pick feature game having a common pick feature enhancement(s). The processor 204 may select façades for each of the 100 credit pattern win and the 1000 credit pattern win that contain one or more pick award values 503 of the bonus pick feature game without pick feature enhancements, and/or the processor 204 may select a façade for the 100 credit pattern win that contains one or more spins and associated outcome(s) of the base game and/or one or more pick award values 503 of the bonus pick feature game without pick feature enhancements, and select a façade for the 1000 credit pattern win that contains one or more pick award values 503 of the bonus pick feature game with one or more pick feature enhancements. Thus, based on the selected façades, the 10 credit pattern win and the 100 credit pattern win may be presented as spins and associated outcomes of the base game and/or one or more pick award values 503 of the bonus pick feature game without pick feature enhancements, and the 1000 credit pattern win may be presented as one or more pick award values 503 of the bonus pick feature game without having one or more pick feature enhancements. This game design advantageously provides flexibility and variability in presenting the largest pattern win(s) under a distinct façade (e.g., as a bonus pick feature game having pick feature enhancements not applied when presenting other winning patterns).

Thus, the pick feature enhancements of the bonus pick feature game may be implemented in Class II and Class III games, and whether an enhancement condition is satisfied may be determined by various means. The methods described herein for determining whether the enhancement condition is satisfied are merely illustrative, and other suitable approaches are contemplated and within the scope of the present disclosure.

In the example implementation, in both Class II and Class III games, in response to the bonus game condition and enhancement condition being satisfied, the bonus pick feature game having one or more pick feature enhancements is triggered after an outcome of the base game (shown in FIG. 4) is displayed. The outcome of the base game includes display of a plurality of symbols on the reels 402-410 in the primary game display area 412. When the bonus pick feature game having one or more pick feature enhancements is triggered, the plurality of symbols displayed in the base game outcome may include one of metamorphic trigger symbols 428-432 or may include a combination of metamorphic trigger symbols 428-432. In the example of FIG. 4, the plurality of symbols include a multiplier metamorphic trigger symbol 428, a jackpot metamorphic trigger symbol 430, and an extra picks metamorphic trigger symbol 432. The plurality of symbols displayed on reels 402-410 may also include any combination of metamorphic trigger symbols 428-432.

Each metamorphic trigger symbol 428-432 is associated with one of the pick feature enhancements that may be applied to the bonus pick feature game. In particular, the multiplier metamorphic trigger symbol 428 is associated with the multiplier enhancement, the jackpot metamorphic trigger symbol 430 is associated with the jackpot enhancement, and the extra picks metamorphic trigger symbol 432 is associated with the extra picks enhancement. In Class II games, a metamorphic trigger symbol 428-432 being displayed in an outcome of the base game is merely representative of an enhancement condition being satisfied. That is, the processor 204 may determine that an enhancement condition is satisfied for a pick feature enhancement (or combination of pick feature enhancements) based on an outcome of the Class II (e.g., bingo) game, and, in response, controls one or more of the first plurality of reels 402-410 to display the associated metamorphic trigger symbol 428-432 (or combination of metamorphic trigger symbols 428-432) in an outcome of the base game. The bonus pick feature game including the pick feature enhancement (or combination of pick feature enhancements) is subsequently initiated, and a player thereby perceives that the display of the metamorphic trigger symbol(s) 428-432 triggers the pick feature enhancement(s).

In Class III games, a metamorphic trigger symbol 428-432 being displayed in an outcome of the base game may itself satisfy an enhancement condition of the pick feature enhancement associated with the metamorphic trigger symbol 428-432 that is displayed. In some implementations, the display of the metamorphic trigger symbol 428-432 may be necessary but not sufficient to trigger a bonus game having the associated pick feature enhancement. Specifically, the display of the metamorphic trigger symbol 428-432 may not satisfy the bonus game condition. As such, in some implementations, there may be instances where, in an outcome of the base game, a metamorphic trigger symbol 428-432 is displayed and a bonus pick feature game is not triggered. Similarly, in Class II games, as described in further detail below, there may be instances where metamorphic trigger symbol 428-432 is displayed but the bonus game is not triggered.

The metamorphic trigger symbols 428-432 respectively correspond to one of a plurality of metamorphics 414-418 that are displayed on a display of an EGM 104A-104X or 200, such as, for example, adjacent to (e.g., above) or within the primary game display area 412. It will be appreciated that the metamorphics 414-418 may appear in any other suitable location as well as on any display of an EGM 104A-104X or 200. For example, in at least some implementations, the metamorphics 414-418 appear at another location adjacent to the primary game display area 412. In other implementations, the metamorphics 414-418 may appear on a secondary display, a button deck display, and the like.

Each metamorphic 414-418 is associated with the same pick feature enhancement of the bonus game as the corresponding metamorphic trigger symbol 428-432. In particular, the metamorphics 414-418 include a multiplier metamorphic 414 corresponding to the multiplier metamorphic trigger symbol 428, a jackpot metamorphic 416 corresponding to the jackpot metamorphic trigger symbol 430, and an extra picks metamorphic 418 corresponding to the extra picks metamorphic trigger symbol 432, which are respectively associated with the multiplier enhancement, the jackpot enhancement, and the extra picks enhancement as described above. In the example of FIG. 4, the metamorphics 414-418 are in the shape of a closed safe. In some examples, the metamorphics 414-418 may be associated with different shapes and/or pick feature enhancements. Metamorphics are not limited to the metamorphics of a multiplier, a jackpot, and/or an extra picks, and thus, the associated pick feature enhancements are similarly not limited. Moreover, in the example implementations, the base game includes display of three metamorphics 414-418. Although three metamorphics 414-418 are shown and described, it will be appreciated that any suitable number of metamorphics may be included in the base game. For example, the number of metamorphics may vary to match a number of potential pick feature enhancements of the bonus pick feature game.

A pick feature enhancement of the bonus game may be triggered if an associated metamorphic trigger symbol 428-432 appears in reels 402-410 in the base game outcome. The display of one of metamorphic trigger symbols 428-432 may result in the activation of the corresponding metamorphic of the metamorphics 414-418 and the triggering of a bonus game with a pick feature enhancement associated with the activated metamorphic. Thereby, the metamorphics 414-418 may be used in conjunction with the metamorphic trigger symbols 428-432 to provide a visual representation to a player that metamorphic trigger symbol 428-432 being displayed in the outcome of the base game triggers the associated pick feature enhancement.

During the base game, the metamorphics 414-418 may each be in an inactive state. For example, in the example implementation, each metamorphic 414-418 is a safe and, in the inactive state, the safe is closed. In response to a metamorphic trigger symbol 428-432 being displayed in an outcome of the base game, the associated metamorphic 414-418 is transformed to either an intermediate state (e.g., in which the safe moves and/or grows in size) or an active state (e.g., in which the safe opens). Whether the associated metamorphic 414-418 transforms to the intermediate state or the active state may be determined based on whether the bonus game is triggered in conjunction with the display of the metamorphic trigger symbol 428-432. As described above, a determination as to whether the bonus game is triggered may be based on a generated RNG outcome that maps to a decision for triggering the bonus game (e.g., in Class III games), or may be based on a lookup operation or query to a database or table that is performed based on an outcome of a primary Class II game (e.g., a bingo game).

If the bonus game is not triggered, the metamorphic 414-418 associated with a displayed metamorphic trigger symbol 428-432 transforms to the intermediate state. That is, the processor 204 causes the metamorphic 414-418 to be transformed to the intermediate state to indicate that the bonus game has not been triggered in conjunction with the display of the associated metamorphic trigger symbol 428-432. Moreover, by transforming the metamorphic 414-418 to the intermediate state, the processor 204 may indicate that the opportunity for a bonus game having the associated pick feature enhancement has increased. If the bonus game is triggered, the metamorphic 414-418 associated with the displayed metamorphic trigger symbol 428-432 transforms to the active state. That is, the processor 204 causes the metamorphic 414-418 to be transformed to the active state to indicate that the bonus game has been triggered in conjunction with the display of the associated metamorphic trigger symbol 428-432, and that the metamorphic trigger symbol 428-432 being displayed triggers the associated pick feature enhancement. If multiple metamorphic trigger symbols 428-432 are displayed (as shown in FIG. 4), the processor 204 may cause each associated metamorphic 414-418 to be transformed to either the intermediate state or the active state, depending on whether the bonus game is triggered. Further, a visual representation that the transformation of the metamorphic 414-418 is caused by the associated metamorphic trigger symbol 428-432 being displayed may be provided, such as by moving the metamorphic trigger symbol 428-432 up toward the associated metamorphic 414-418 before and/or during the metamorphic 414-418 being transformed. This mechanic advantageously relays information via the user interface or display of the gaming device related to the backend processing of the game that would not otherwise be known by or provided to a player.

The bonus pick feature game will now be described in more detail still referring to FIGS. 5-7, which illustrate user interfaces or screenshots 500-700 of the bonus game. FIG. 5 illustrates a screenshot 500 of the bonus game, in which one of the metamorphics 414-418 is activated. FIG. 6 illustrates a screenshot 600 of the bonus game, in which two of the metamorphics 414-418 are activated. FIG. 7 illustrates a screenshot 700 of the bonus game, in which three of metamorphics 414-418 are activated. Metamorphics 414-418 may be activated in any combination, and are not limited to the activated combinations as shown in FIGS. 5-7. As described above and shown in FIGS. 5-7, in the example bonus pick feature game, the plurality of pick icons 502 is displayed in the secondary game display area 504 of a gaming device (e.g., gaming devices 104A-104X, 256, and/or 264*a*-264*c*). The plurality of pick icons 502 may be arranged in a matrix (e.g., pick icon matrix) including the rows 506 and columns 508. The secondary game display area 504 of the bonus game may additionally include the jackpot meters 420-426. In the example of FIGS. 5-7, the pick icons 502 are in the shape of a closed safe. In some examples, the pick icons 502 may be a different shape.

The number of pick icons 502 in rows 506 and/or columns 508 may vary based on the number of metamorphics 414-418 that are activated. Additionally, the number of rows 506 and/or the number of columns 508 may vary based on the number of metamorphics 414-418 that are activated. For example, if one of the metamorphics 414-418 is activated, the pick icons 502 may be displayed in three rows 506 and three columns 508, each row 506 and each column 508 including three pick icons 502, creating a 3×3 matrix of pick icons 502 (as shown in FIG. 5). If two of the metamorphics 414-418 are activated, the pick icons 502 may be displayed in five rows 506 and three columns 508, each row 506 including three pick icons 502 and each column 508 including five pick icons 502, creating a 5×3 matrix of pick icons 502 (as shown in FIG. 6). If three of the metamorphics 414-418 are activated, the pick icons 502 may be displayed in five rows 506 and five columns 508, each row 506 including five pick icons 502 and each column 508 including five pick icons 502, creating a 5×5 matrix of pick icons 502 (as shown in FIG. 7).

The number of pick icons 502 in the rows 506 and columns 508 may also vary based on the combination of metamorphics 414-418 that are activated. Additionally, the number of rows 506 and the number of columns 508 may also vary based on the combination of the metamorphics 414-418 that are activated. For example, the combination of the metamorphics 414-418 that are activated may vary the number of rows 506, the number of columns 508, and the number of pick icons 502 in rows 506 and columns 508, creating a variably sized matrix of pick icons 502.

The bonus game may be provided with a displayed indication that the bonus game is distinct from the base game shown in FIG. 4. For example, the bonus game may be provided in conjunction with a change to an overlaid translucent or transparent colored graphic effect (e.g., a background display color) around the secondary game display area 504, the metamorphics 414-418, and/or the jackpot meters 420-426. The background display color may vary based on the number and/or combination of metamorphics 414-418 that are activated. For example, the background display color may include, but is not limited to, a purple background if one of metamorphics 414-418 is activated (as shown in FIG. 5), a yellow background if two of metamorphics 414-418 are activated (as shown in FIG. 6), and a red background if three of metamorphics 414-418 are activated (as shown in FIG. 7). The background display color provided in conjunction with the bonus game is not limited to the examples as shown in FIGS. 5-7. The background display color may be displayed for the duration of the bonus game to let a player know that each pick selection will be accompanied by an award (e.g., corresponding to an award of each of the multiple winning patterns of the bingo game outcome). In other implementations, words, symbols, letters, metamorphics, and/or other visual effects may be displayed on or adjacent the secondary game display area 504, the metamorphics 414-418, and/or the jackpot meters 420-426, in addition to and/or alternative to the displayed background color of the bonus game. In some examples, the bonus game may be provided without a change to any background display color or other graphic or visual effect from the base game.

A player selection of a pick icon 502 may reveal an outcome of the pick icon 502. The outcome of a pick icon 502 may be displayed in conjunction with a transformation or animation of the pick icon 502. In the example of FIG. 5, when a pick icon 502 is selected, the bonus game displays a transformation of the pick icon 502 shown as a safe-opening animation of the pick icon 502, resulting in the display of an activated pick icon as an open safe 507. The transformation of the pick icon 502 into the activated pick icon 507 may be shown as a display change from a closed safe in the bonus game prior to the pick icon 502 being selected to a safe-opening animation resulting in an opened safe in the bonus game after the pick icon 502 is selected. In some examples, a different animation of the pick icon 502 may be shown for an icon associated with a different shape.

The outcome of a selected pick icon 502 may be a pick icon award value 503 (also referred to as a pick prize value 503). In the example of FIG. 5, three pick prize values 503, of 250 credits, 400 credits, and 1700 credits, are displayed over three selected pick icons 502, shown as opened safes 507.

In Class II examples, the reveal order of pick prize values 503 of selected pick icons 502 may be predetermined. For a predetermined order of pick prize values 503 of selected pick icons 502, the pick prize values 503 of the predetermined order of pick prize value 503 will be successively displayed as selections of pick icons 502 are made, regardless of the location of the selected pick icons 502 in the matrix. This provides a perception of randomization, although the underlying outcomes of the selected pick icons 502 are predetermined. In Class III examples, the reveal order of selected pick prize values 503 of pick icons 502 may be random as the pick prize values 503 may be randomly determined with each selection of a pick icon 502. In some examples, the outcome of pick icon 502 that is not selected by a player may also be revealed at the conclusion of the bonus game.

The display of the multiplier metamorphic trigger symbol 428 on the reels 402-410 in the base game outcome may trigger a bonus game including the activation of multiplier metamorphic 414, resulting in the display of an activated multiplier metamorphic 505 and the application of a multiplier enhancement. As shown in FIGS. 5-7, the multiplier enhancement may include a safe-opening animation of the multiplier metamorphic 414, displaying a closed safe in the base game and a safe-opening animation resulting in an opened safe in the bonus game. The multiplier enhancement may include a multiplier value 510 displayed over the multiplier metamorphic 414, shown as an open safe. In some examples, a different animation may be shown for metamorphics associated with a different shape.

In the example of FIG. 5, the multiplier value 510 is displayed as ×4. When the multiplier enhancement is applied to the bonus game and pick icons 502 are selected by the player, the pick prize value 503 of a selected pick icon 502 may be multiplied by the multiplier value 510. In some examples, the multiplier value 510 may apply to any selected pick icon 502. In other examples, the multiplier value 510 may apply only to a subset of the selected pick icons 502. In the example of FIG. 5, the multiplier value 510 displayed is applied only to a subsequently selected pick icon 502. Stated differently, the multiplier value 510 changes prior to subsequent selections of a pick icon 502. In some examples, the multiplier value 510 may persist for all selections of pick icon 502 in the bonus game. A pick prize value 503 of selected pick icon 502 may be awarded to the player as credits after a selection and reveal of the pick prize value 503 or after the bonus game terminates.

The display of the jackpot metamorphic trigger symbol 430 on the reels 402-410 in the base game outcome may trigger a bonus game including the activation of jackpot metamorphic 416, resulting in the display of an activated jackpot metamorphic 612 (shown in FIG. 6) and the application of a jackpot enhancement. As shown in FIGS. 5-7, the jackpot enhancement may include a safe-opening animation of jackpot metamorphic 416, in which a closed safe in the base game transforms, displayed as a safe-opening animation, into an opened safe in the bonus game. In some examples, a different animation may be shown for metamorphics associated with a different shape.

As shown in FIG. 6, the jackpot enhancement may include display of jackpot meter progress symbols 602-608 associated with the jackpot meters 420-426 to visually represent the progress towards winning the associated jackpot meter award amount. The jackpot meter progress symbols 602-608 may include a grand jackpot meter progress symbol 602, a major jackpot meter progress symbol 604, a minor jackpot meter progress symbol 606, and a mini jackpot meter progress symbol 608. The jackpot meter progress symbols 602-608 may be displayed as incomplete or "unfilled" (e.g., unfilled jackpot meter progress symbols). In the example of FIG. 6, four grand jackpot meter progress symbols 602, three major jackpot meter progress symbols 604, three minor jackpot meter progress symbols 606, and three mini jackpot meter progress symbols 608 are displayed.

When the jackpot enhancement is applied to the bonus game and pick icon(s) 502 are selected, the outcome of a selected pick icon 502 may be a jackpot award progress symbol 610 corresponding to the jackpot meter progress symbols 602-608. The jackpot award progress symbol 610 may be of the same color and/or shape as the jackpot meter progress symbols 602-608 to visually depict the progress towards winning the associated jackpot meter award amount. In the example of FIG. 6, one of the jackpot award progress symbols 610 corresponds to the grand jackpot meter progress symbol 602, one of the jackpot award progress symbols 610 corresponds to the major jackpot meter progress symbol 604, two of the jackpot award progress symbols 610 correspond to the minor jackpot meter progress symbol 606, and two of the jackpot award progress symbols 610 correspond to the mini jackpot meter progress symbol 608.

As a jackpot award progress symbol 610 is displayed with a pick icon 502, the jackpot meter progress symbols 602-608 corresponding to the jackpot award progress symbol 610 may be displayed under the jackpot meters 420-426. The display of the jackpot meter progress symbols 602-608 may appear as the completion or "filling in" of the jackpot meter progress symbols 602-608 as the jackpot meter progress symbols 602-608 that appear incomplete or "unfilled" are replaced with the jackpot meter progress symbols 602-608 that appear completed or "filled in" (e.g., colored in). The jackpot meter progress symbols 602-608 may be the same color as the jackpot meters 420-426. A jackpot value corresponding to the jackpot meters 420-426 may be awarded to the player when all the jackpot meter progress symbols 602-608 of the associated jackpot meter 420-426 are displayed and/or "filled in" (e.g., colored in) under the associated jackpot meter 420-426. The pick icon 502 may show the jackpot meter progress symbols 602-608 associated with one of the jackpot meters 420-426 or with any combination of the jackpot meters 420-426.

The display of the extra picks metamorphic trigger symbol 432 on the reels 402-410 of the base game may trigger a bonus game including the activation of the extra picks metamorphic 418, resulting in the display of an activated extra picks metamorphic 614 (shown in FIGS. 6 and 7) and the application of an extra picks enhancement. As shown in FIGS. 5-7, the extra picks enhancement may include a safe-opening animation of extra picks metamorphic 418, displaying a closed safe in the base game and a safe-opening animation resulting in an opened safe in the bonus game. In some examples, a different animation may be shown for metamorphics associated with a different shape.

When the extra picks enhancement is applied to the bonus game and pick icon(s) 502 are selected, the outcome of the selected pick icon 502 may be an extra pick number 702, or an award that includes an extra number of pick selections for a play of the bonus game, rather than a pick icon award value 503. A total pick number 704, or a total number of pick selections, for the bonus game may be displayed, visually representing the total number of pick selections that are available during a play of the bonus game. A remaining pick number 706, or a remaining number of pick selections, for the bonus game may also be displayed, visually representing the remaining number of pick selections that are available during the play of the bonus game. The remaining pick number 706 may be equal to or less than the total pick number 704, and the remaining pick number 706 is decremented after each selection of a pick icon 502. The extra pick number 702 may be added to the total pick number 704 to visually represent the increased number of picks available (e.g., increased total pick number) in the bonus game after extra pick number 702 is revealed. In the example of FIG. 7, extra pick numbers 702 of +1 and +2 are displayed.

The combination of the metamorphic trigger symbols 428-432 displayed on the reels 402-410 of the base game may determine the combination of the metamorphics 414-418 that are activated and the combination of pick feature enhancements that are applied to the bonus game. The pick feature enhancements may apply to the bonus game as a whole, displaying the pick icons 502 and revealing any pick icon award values or other awards corresponding with any of the applicable pick feature enhancements. For example, a bonus game with more than one of the metamorphics 414-418 and more than one associated pick feature enhancement may display pick icons 502 associated with any of the applicable pick feature enhancements. For example, as illustrated in FIG. 7, pick feature enhancements associated with the multiplier metamorphic 414, the jackpot metamorphic 416, and the extra picks metamorphic 418 are applied to the bonus game. When a pick icon 502 displayed during a bonus game including these pick feature enhancements is selected, a pick prize value 503 that may be multiplied by a multiplier value 510, a jackpot award progress symbol 610, and/or an extra pick number 702 may be revealed.

Additionally, the pick feature enhancements may apply to one of the pick icons 502, displaying the pick icon 502 that may reveal outcomes associated with a combination of the applicable pick feature enhancements. For example, a bonus game with more than one activated metamorphics 414-418 and more than one associated pick feature enhancement may display a pick icon 502 associated with any combination of the applicable pick feature enhancements. In the example of FIG. 7, pick feature enhancements associated with multiplier metamorphic 414, jackpot metamorphic 416, and extra picks metamorphic 418 are applied to the bonus game. A pick icon 502 may include a combination pick icon 708 that reveals at least one of pick prize value 503 multiplied by multiplier value 510, jackpot award progress symbol 610, and/or extra pick number 702 when selected.

The illustrated examples of the bonus pick feature game having the enhancements applied as shown in FIGS. 5-7 are by way of example only, and any of the pick feature enhancements described herein may be mixed, matched, and combined during the bonus game. For example, the bonus game may include any combination of the multiplier enhancement, the jackpot enhancement, and the extra picks enhancement, such as any two of these enhancements or all three of these characteristics in a single bonus game.

Figure 8:
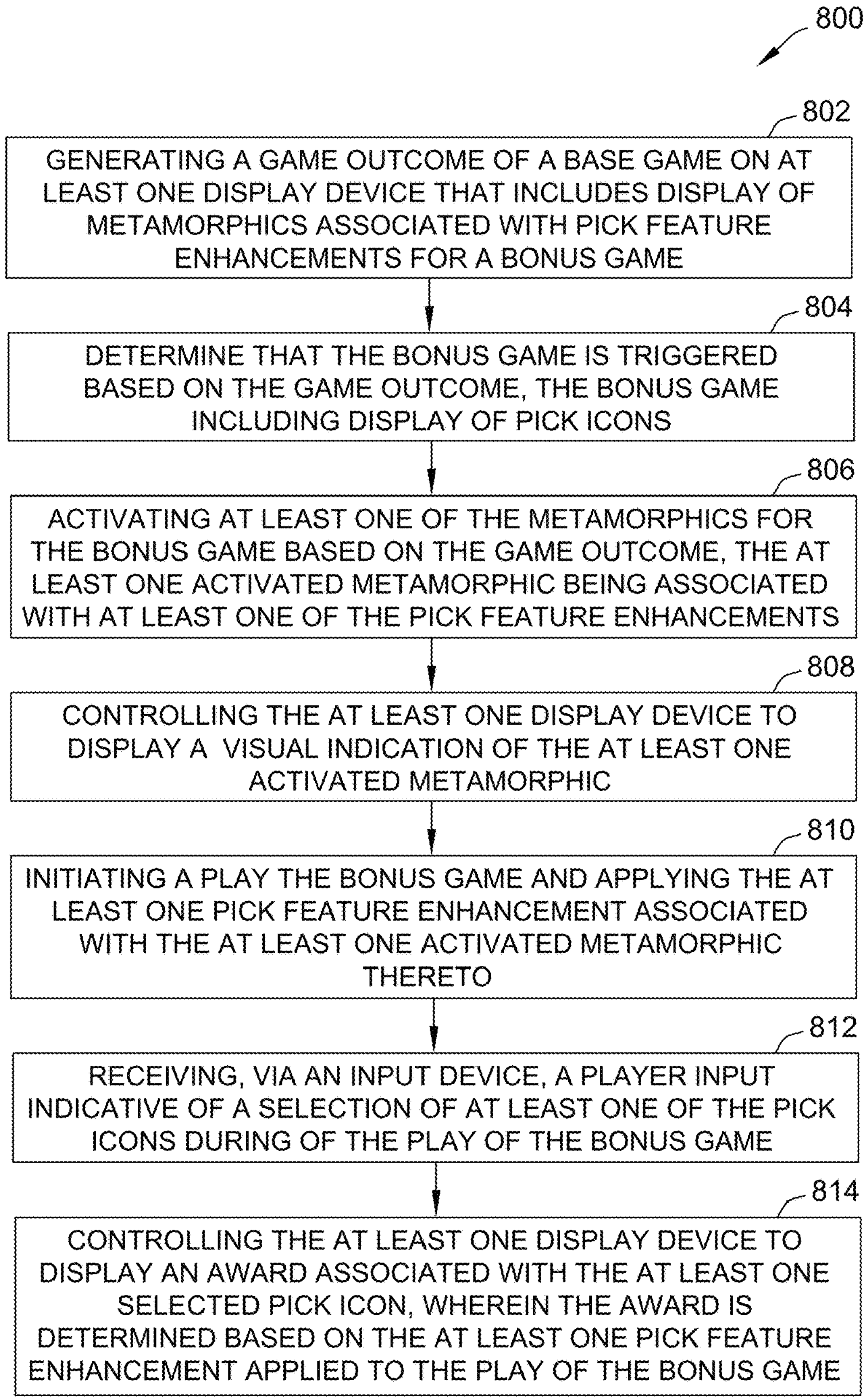
FIG. 8 is an example computer-implemented method of electronic gaming in accordance with the present disclosure.

FIG. 8 illustrates an example computer-implemented method 800 of electronic gaming in accordance with the present disclosure. The example method 800 may be implemented in a server (e.g., server 102) and/or a gaming device (e.g., gaming devices 104A-104X in FIG. 1, and/or gaming device 200 and/or mobile gaming device 256 in FIG. 2). For example, in an electronic gaming device, a game controller (e.g., game controller 202) includes one or more processors 204 operatively coupled to memory 208. The memory 208 can store one or more game programs 206 that provide program instructions and/or data for carrying out various implementations (e.g., game mechanics) that, when executed by the processor 204, cause the processor 204 to perform certain operations to perform the method 800.

The method 800 includes generating 802 a game outcome of a base game (e.g., the base game shown in FIG. 4) on at least one display device (e.g., in the primary game display area 412). The game outcome of the base game may correspond to (e.g., present, represent, and/or are determined from) a Class II (e.g., bingo) game outcome, or the base game may be a Class III or Las-Vegas style game. The base game includes display of metamorphics 414-418 on the at least one display device (e.g., adjacent to or within the primary game display area 412). The metamorphics 414-418 are associated with pick feature enhancements for a bonus game (e.g., the bonus game shown in FIGS. 5-7). For example, the metamorphics 414-418 may include a multiplier metamorphic 414 associated with a multiplier enhancement, a jackpot metamorphic 416 associated with a jackpot enhancement, and an extra picks metamorphic 418 associated with an extra picks enhancement. The bonus game includes display of pick icons 502 (e.g., within a secondary game display area 504). The pick icons 502 are selectable by a player (e.g., via an input device or touch screen) and each includes an associated award that is revealed when the pick icon 502 is selected.

The method 800 also includes determining 804 that the bonus game is triggered based on the game outcome. The bonus game may be triggered by the game outcome satisfying a bonus game condition. In Class II games, the bonus game may be part of a façade that presents a primary Class II game (e.g., a bingo game) outcome, and the façade may be selected based on a lookup operation or query to a database or table. For example, the database or table may store façades that are capable of presenting primary Class II game outcomes that have a predefined or preselected number of winning outcomes (e.g., winning bingo patterns) and/or an award value that is greater than or equal to a predetermined award value as winning outcomes of the bonus pick feature game. The bonus game condition may thereby be satisfied where the lookup operation or query identifies and selects (e.g., based on a random number provided by the RNG 212) a façade or façades that include display of winning outcomes of the bonus pick feature game. In Class III games, the bonus game may be triggered based on a generated RNG outcome that maps to a decision for triggering the bonus game, based on a preselected or predefined symbol combination and/or symbol type being displayed in the game outcome of the base game (which may be determined by and/or trigger the generation of an RNG outcome that maps to a decision for triggering the bonus game), or any other suitable trigger condition.

The method 800 also includes activating 806 at least one of the metamorphics 414-418 for the bonus game based on the game outcome. When one or more of the metamorphics 414-418 is activated, the associated pick feature enhancement is applied to the bonus game. Activation of the one or more metamorphics 414-418 may be in response to an enhancement condition being satisfied from the game outcome. In Class II games, the bonus game having one or more pick feature enhancements may be part of a façade that presents a primary Class II game (e.g., a bingo game) outcome, and the façade may be selected based on a lookup operation or query to a database or table. For example, the database or table may store façades that are capable of presenting primary Class II game outcomes that have a predefined or preselected number of winning outcomes (e.g., winning bingo patterns) and/or an award value that is greater than or equal to a predetermined award value as winning outcomes of the bonus pick feature game having one or more pick feature enhancements. The enhancement condition may thereby be satisfied where the lookup operation or query identifies and selects (e.g., based on a random number provided by the RNG 212) a façade or façades that include display of winning outcomes of the bonus pick feature game having one or more pick feature enhancements. In Class III games, the metamorphics 414-418 may be activated based on a generated RNG outcome that maps to a decision for applying a pick feature enhancement to the bonus game, based on a preselected or predefined symbol combination and/or symbol type being displayed in the game outcome of the base game (which may be determined by and/or trigger the generation of an RNG outcome that maps to a decision for applying a pick feature enhancement to the bonus game), or any other suitable trigger condition.

In response to the one or more metamorphics 414-418 being activated, the method 800 includes controlling 808 the at least one display device to display a visual indication of the at least one activated metamorphic. In example implementations, the metamorphics 414-418 may each be in the form of a closed safe (in an inactive state) during the base game and, when activated, the metamorphics transition or transform to an active state in which the safe opens. The method 800 also includes initiating 810 a play of the bonus game and applying the at least one pick feature enhancement associated with the at least one activated metamorphic 414-418 thereto.

During the play of the bonus game, the method 800 includes receiving 812, via an input device, a player input indicative of a selection of at least one of the pick icons 502 during the play of the bonus game. Selection of the pick icons 502 reveals an award associated with the pick icon 502. The award may be a pick icon award value 503, or may be another award that may be modified by the applied pick feature enhancement. For example, the award associated with the pick icon 502 may be a multiplier value 510 applied to pick icon award value(s) 503 when a multiplier enhancement is applied, a jackpot award progress symbol 610 when a jackpot enhancement is applied, or an extra pick number 702 when an extra picks enhancement is applied. The pick feature enhancements may be applied alone or in any combination, and as such the award associated with the selected pick icon(s) 502 may vary based on the applied pick feature enhancement(s). The method 800 also includes controlling 814 the at least one display device to display the award associated with the at least one selected pick icon.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the implementations described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the implementations described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary implementation, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:

at least one display device configured to display an electronic game that includes a base game, a bonus game, and metamorphics associated with pick feature enhancements for the bonus game;

an input device operable to receive a player input; and a game controller in communication with the at least one display device and the input device, the game controller comprising at least one processor and at least one memory, the at least one memory storing instructions that, when executed by the at least one processor, cause the game controller to:

determine that the bonus game is triggered based on a game outcome of the base game, the bonus game including display of pick icons;

activate at least one of the metamorphics for the bonus game based on the game outcome, the at least one activated metamorphic being associated with at least one of the pick feature enhancements;

cause display of a visual indication of the at least one activated metamorphic;

initiate a play of the bonus game and apply the at least one pick feature enhancement associated with the at least one activated metamorphic thereto;

receive, via the input device, the player input indicative of a selection of at least one of the pick icons during the play of the bonus game; and cause display of an award associated with the at least one selected pick icon, wherein the award is determined based on the at least one pick feature enhancement applied to the play of the bonus game.

2. The electronic gaming system of claim 1, wherein the game outcome of the base game includes at least one metamorphic trigger symbol, the at least one activated metamorphic being associated with the at least one metamorphic trigger symbol in the game outcome and being activated in response thereto.

3. The electronic gaming system of claim 1, wherein the metamorphics include a multiplier metamorphic associated with a multiplier enhancement applied to the play of the bonus game when the multiplier metamorphic is activated.

4. The electronic gaming system of claim 3, wherein the multiplier enhancement includes at least one multiplier value applied to a value of the award associated with the at least one selected pick icon.

5. The electronic gaming system of claim 4, wherein the at least one multiplier value includes different multiplier values applied to awards associated with different selected pick icons.

6. The electronic gaming system of claim 1, wherein the metamorphics include a jackpot metamorphic associated with a jackpot enhancement applied to the play of the bonus game when the jackpot metamorphic is activated, and wherein, when the jackpot enhancement is applied to the play of the bonus game, the instructions, when executed, further cause the game controller to cause display of a jackpot meter including at least one incomplete jackpot meter progress symbol, cause display of a jackpot award progress symbol associated with the at least one selected pick icon, and cause display of the at least one incomplete jackpot meter progress symbol to transform into a completed jackpot meter progress symbol in response to display of the jackpot award progress symbol.

7. The electronic gaming system of claim 6, wherein the instructions, when executed, further cause the game controller to award a jackpot value associated with the jackpot meter when each of the at least one incomplete jackpot meter progress symbol have been transformed into the completed jackpot meter progress symbol.

8. The electronic gaming system of claim 1, wherein the play of the bonus game includes a total number of pick selections and a remaining number of pick selections, wherein the remaining number of pick selections is decremented after each pick icon that is selected during the play of the bonus game.

9. The electronic gaming system of claim 8, wherein the metamorphics include an extra picks metamorphic associated with an extra picks enhancement applied to the play of the bonus game when the extra picks metamorphic is activated.

10. The electronic gaming system of claim 9, wherein when the extra picks enhancement is applied to the bonus game, the instructions, when executed, further cause the game controller to cause display of the award associated with the at least one selected pick icon that includes an extra number of pick selections, and cause the total number of pick selections to increase to a sum of the extra number of pick selections and the total number of pick selections.

11. The electronic gaming system of claim 1, wherein the pick icons are displayed in a pick icon matrix comprising at least one row and at least one column, wherein a number of the at least one row and a number of the at least one column of the pick icon matrix are determined based on the at least one activated metamorphic.

12. The electronic gaming system of claim 1, wherein the at least one selected pick icon includes two or more selected pick icons, the awards associated with the selected pick icons being displayed in a reveal order that is predetermined or random.

13. The electronic gaming system of claim 1, wherein the instructions, when executed, further cause the game controller to determine that the bonus game is triggered and activate the at least one of the metamorphics for the bonus game based on one or more outcomes generated by a random number generator in response to the game outcome.

14. The electronic gaming system of claim 1, wherein the instructions, when executed, further cause the game controller to generate a primary game output that determines the game outcome of the base game, and to determine that the bonus game is triggered and activate the at least one of the metamorphics for the bonus game based on a lookup operation using the primary game output.

15. The electronic gaming system of claim 14, wherein the primary game output is an outcome of a bingo game randomly generated by the game controller.

16. A non-transitory computer-readable storage medium with instructions stored thereon that, in response to execution by at least one processor, cause the at least one processor to:

generate a game outcome of a base game on at least one display device, the base game including display of metamorphics on the at least one display device, the metamorphics being associated with pick feature enhancements for a bonus game;

determine that the bonus game is triggered based on the game outcome, the bonus game including display of pick icons on the at least one display device;

activate at least one of the metamorphics for the bonus game based on the game outcome, the at least one activated metamorphic being associated with at least one of the pick feature enhancements;

cause display of a visual indication of the at least one activated metamorphic;

initiate a play of the bonus game and apply the at least one pick feature enhancement associated with the at least one activated metamorphic thereto;

receive, via an input device, a player input indicative of a selection of at least one of the pick icons during the play of the bonus game; and cause display of an award associated with the at least one selected pick icon, wherein the award is determined based on the at least one pick feature enhancement applied to the play of the bonus game.

17. The non-transitory computer-readable storage medium of claim 16, wherein the game outcome of the base game includes at least one metamorphic trigger symbol, the at least one activated metamorphic being associated with the at least one metamorphic trigger symbol in the game outcome and being activated in response thereto.

18. The non-transitory computer-readable storage medium of claim 16, wherein the metamorphics include a multiplier metamorphic associated with a multiplier enhancement applied to the play of the bonus game when the multiplier metamorphic is activated, a jackpot metamorphic associated with a jackpot enhancement applied to the play of the bonus game when the jackpot metamorphic is activated, and an extra picks metamorphic associated with an extra picks enhancement applied to the play of the bonus game when the extra picks metamorphic is activated.

19. A computer-implemented method of electronic gaming, the method comprising:

generating a game outcome of a base game on at least one display device, the base game including display of metamorphics on the at least one display device, the metamorphics being associated with pick feature enhancements for a bonus game;

determining that the bonus game is triggered based on the game outcome, the bonus game including display of pick icons on the at least one display device;

activating at least one of the metamorphics for the bonus game based on the game outcome, the at least one activated metamorphic being associated with at least one of the pick feature enhancements;

controlling the at least one display device to display a visual indication of the at least one activated metamorphic;

initiating a play of the bonus game and applying the at least one pick feature enhancement associated with the at least one activated metamorphic thereto;

receiving, via an input device, a player input indicative of a selection of at least one of the pick icons during the play of the bonus game; and controlling the at least one display device to display an award associated with the at least one selected pick icon, wherein the award is determined based on the at least one pick feature enhancement applied to the play of the bonus game.

20. The method of claim 19, wherein the game outcome of the base game includes at least one metamorphic trigger symbol, the method comprising activated the at least one metamorphic in response to the at least one metamorphic trigger symbol in the game outcome, the at least one activated metamorphic being associated with the at least one metamorphic trigger symbol.

* * * * *